(12) United States Patent
Watson et al.

(10) Patent No.: US 11,492,119 B1
(45) Date of Patent: Nov. 8, 2022

(54) METHODS AND SYSTEMS FOR STREAMING CONTENT ON A TRANSPORTATION VEHICLE

(71) Applicant: Panasonic Avionics Corporation, Lake Forest, CA (US)

(72) Inventors: Philip S. Watson, Lake Forest, CA (US); Steven Bates, Lake Forest, CA (US); Sanjiv Pimple, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 0 days.

(21) Appl. No.: 17/356,057

(22) Filed: Jun. 23, 2021

(51) Int. Cl.
*B64D 11/00* (2006.01)
*H04N 21/231* (2011.01)
*H04N 21/258* (2011.01)
*H04N 21/232* (2011.01)

(52) U.S. Cl.
CPC ....... *B64D 11/0015* (2013.01); *H04N 21/232* (2013.01); *H04N 21/23106* (2013.01); *H04N 21/23113* (2013.01); *H04N 21/25808* (2013.01)

(58) Field of Classification Search
CPC ......... B64D 11/0015; H04N 21/23106; H04N 21/23113; H04N 21/232; H04N 21/25808
See application file for complete search history.

(56) References Cited

U.S. PATENT DOCUMENTS

| | | | |
|---|---|---|---|
| 6,240,414 B1 * | 5/2001 | Beizer | G06F 16/1787 |
| 6,249,913 B1 * | 6/2001 | Galipeau | H04N 21/4143 |
| | | | 348/E7.071 |
| 6,899,390 B2 * | 5/2005 | Sanfrod | B64D 11/0624 |
| | | | 297/217.4 |
| 7,814,515 B2 * | 10/2010 | Ohyama | H04L 65/65 |
| | | | 725/77 |
| 7,836,472 B2 * | 11/2010 | Brady, Jr. | H04N 21/2146 |
| | | | 725/74 |
| 7,984,190 B2 * | 7/2011 | Rhoads | H04L 67/06 |
| | | | 709/248 |
| 8,176,363 B2 * | 5/2012 | Zlotnick | G06F 11/2082 |
| | | | 714/13 |

(Continued)

OTHER PUBLICATIONS

"The Netflix IMF Workflow"; Netflix Technology Blog; https://netflixtechblog.com/the-netflix-imf-workflow-f45dd72ed700; Apr. 4, 2016; 8 pages.

(Continued)

*Primary Examiner* — Michael B. Pierorazio
(74) *Attorney, Agent, or Firm* — Loza & Loza, LLP; Tejinder Singh

(57) ABSTRACT

Methods and systems are provided for a transportation vehicle. One method includes caching, by a ground-based caching device, media content provided by a streaming service; pre-fetching, by a server on an aircraft, a subset of the cached media content that is likely to be viewed by passengers on the aircraft, the pre-fetched content stored in a cache on the aircraft; presenting, by a first device on the aircraft, a first subset of the pre-fetched content to a non-subscriber of the media content on a first flight; presenting, by a second device on the aircraft, a second subset of the pre-fetched content to a subscriber of the media content on the first flight; and storing, by the second device, viewing history of the second subset by the subscriber.

20 Claims, 16 Drawing Sheets

(56) References Cited

U.S. PATENT DOCUMENTS

| | | | |
|---|---|---|---|
| 8,649,161 B2* | 2/2014 | Kato | H04N 21/41422 |
| | | | 345/905 |
| 8,782,637 B2* | 7/2014 | Khalid | G06F 8/61 |
| | | | 718/1 |
| 9,041,670 B2* | 5/2015 | Kobayashi | H04N 21/42208 |
| | | | 345/173 |
| 9,083,581 B1* | 7/2015 | Addepalli | G06F 3/017 |
| 9,509,937 B2* | 11/2016 | Easterling | H04N 21/43615 |
| 9,961,373 B2* | 5/2018 | Margis | G06F 3/0482 |
| 10,097,603 B2* | 10/2018 | Watson | H04N 21/2146 |
| 10,097,879 B1 | 10/2018 | Bates et al. | |
| 10,256,646 B2* | 4/2019 | Suen | B64D 11/00 |
| 10,348,832 B2* | 7/2019 | Bedekar | H04L 67/104 |
| 2004/0109668 A1 | 6/2004 | Stuckman | |
| 2006/0174285 A1* | 8/2006 | Brady | H04N 21/2146 |
| | | | 725/78 |
| 2007/0106771 A1* | 5/2007 | Lucash | H04L 67/1095 |
| | | | 709/223 |
| 2007/0250873 A1* | 10/2007 | Ohyama | H04N 21/2146 |
| | | | 725/74 |
| 2008/0016081 A1* | 1/2008 | MacMillan | G06F 16/951 |
| 2008/0016196 A1* | 1/2008 | MacMillan | H04L 67/125 |
| | | | 709/223 |
| 2010/0262509 A1 | 10/2010 | Delia et al. | |
| 2012/0112694 A1* | 5/2012 | Frisch | B60L 53/11 |
| | | | 320/109 |
| 2012/0166337 A1 | 6/2012 | Park et al. | |
| 2012/0233610 A1* | 9/2012 | Mandre | G06F 9/455 |
| | | | 718/1 |
| 2013/0093958 A1* | 4/2013 | Yoshikawa | H04N 21/41422 |
| | | | 348/E5.057 |
| 2013/0144487 A1* | 6/2013 | Suzuki | G06F 17/00 |
| | | | 701/36 |
| 2014/0059184 A1* | 2/2014 | Bird | H04L 65/60 |
| | | | 709/219 |
| 2014/0074918 A1* | 3/2014 | Wang | H04L 67/104 |
| | | | 709/203 |
| 2014/0280996 A1* | 9/2014 | Harrang | H04L 65/612 |
| | | | 709/229 |
| 2014/0366125 A1* | 12/2014 | Murata | H04W 12/06 |
| | | | 726/17 |
| 2015/0026713 A1* | 1/2015 | Jain | H04N 21/258 |
| | | | 725/23 |
| 2015/0256580 A1* | 9/2015 | Morton | H04N 21/232 |
| | | | 709/219 |
| 2015/0334441 A1* | 11/2015 | Sukegawa | H04N 21/436 |
| | | | 725/25 |
| 2016/0055011 A1* | 2/2016 | Choi | G06F 9/45533 |
| | | | 710/10 |
| 2016/0311348 A1 | 10/2016 | Watson et al. | |
| 2016/0335108 A1* | 11/2016 | Ryu | G06F 9/45558 |
| 2016/0344792 A1* | 11/2016 | Sinivaara | H04N 21/25841 |
| 2017/0188201 A1 | 6/2017 | Cansino et al. | |
| 2019/0118950 A1* | 4/2019 | Pozzi | H05K 7/1412 |
| 2019/0268633 A1* | 8/2019 | Jayawardene | H04N 21/23103 |
| 2020/0104467 A1 | 4/2020 | Lesser | |
| 2021/0004800 A1 | 1/2021 | Aggarwal et al. | |
| 2021/0120315 A1* | 4/2021 | Makinen | H04N 21/236 |

OTHER PUBLICATIONS

"Netflix Open Connect Overview"; Netflix, Inc.; 2016; 5 pages.

"A cooperative approach to content delivery"; A Netflix briefing paper; 2021; 42 pages.

"Netflix Open Connect Deployment Guide"; Netflix Open Connect Partner Portal; https://openconnect.zendesk.com/hc/en-us/articles/360041674311; Oct. 7, 2021; 38 pages.

Finkelman et al.; "Open Caching Request Routing Functional Specification"; Streaming Video Alliance; Nov. 14, 2016; 46 pages.

"Open Cache Control Layer Functional Requirements Document—Version 0.3"; Streaming Video Alliance; 20 pages.

Yeshurun, Amir; "Open Caching Logging Integration Functional Specification—Version 0.2"; Streaming Video Alliance; Jun. 2017; 11 pages.

"Open Caching CORS Functional Specification—Version 0.0"; Streaming Video Alliance; Aug. 2017; 15 pages.

"Open Caching Interfaces for Edge Multicast/Broadcast Streaming—Version 0.0"; Streaming Video Alliance; Nov. 2017; 7 pages.

"Open Caching Working Group"; Streaming Video Alliance; Apr. 20, 2017; 19 pages.

Klein et al.; "Open Caching Request Routing Functional Specification"; Streaming Video Alliance; 2020; 64 pages.

Klein et al.; "Open Caching Relayed Token Authentication"; Streaming Video Alliance; Jun. 16, 2020; 38 pages.

Newman et al.; "Home Storage Functional Specification"; Streaming Video Alliance; 2022; 60 pages.

Klein et al.; "Open Caching Configuration Interface: Part 1—Overview & Architecture"; Streaming Video Alliance; Feb. 3, 2022; 24 pages.

Klein et al.; "Open Caching Configuration Interface: Part 2—Extensions to CDNi Metadata Object Model"; Streaming Video Alliance; Feb. 3, 2022; 112 pages.

Klein et al.; "Open Caching Configuration Interface: Part 3—Publishing Layer APIs"; Streaming Video Alliance; Feb. 3, 2022; 81 pages.

Gressel et al.; "Open Caching API Implementation Guidelines"; Streaming Video Alliance; May 4, 2021; 64 pages.

Gressel et al.; "Open Caching API Content Management"; Streaming Video Alliance; Feb. 8, 2021; 13 pages.

Gressel et al.; "Open Caching API Implementation Guidelines"; Streaming Video Alliance; May 4, 2021; 25 pages.

Finkelman et al.; "Open Caching Relayed Token Authentication"; Streaming Video Alliance; 2018; 26 pages.

Non-Final Office Action on co-pending US application (U.S. Appl. No. 17/356,103) dated Nov. 24, 2021.

* cited by examiner

US 11,492,119 B1

METHODS AND SYSTEMS FOR STREAMING CONTENT ON A TRANSPORTATION VEHICLE

TECHNICAL FIELD

The present disclosure relates to transportation vehicles in general, and more particularly, to streaming over the top ("OTT") content provided by a streaming service on aircrafts and other transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Various streaming services provide "over-the-top" ("OTT") media content or OTT content, e.g., NETFLIX, AMAZON INC., DISNEY+, HULU, PARAMOUNT+, PEACOCK, and others (without derogation of any third-party trademark rights) to consumers. It is difficult to present OTT content on an aircraft and other transportation vehicles due to lack of network connectivity during a flight and the overall operating environment. Continuous efforts are being made to develop computing technology to make OTT content securely available on aircrafts and other transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
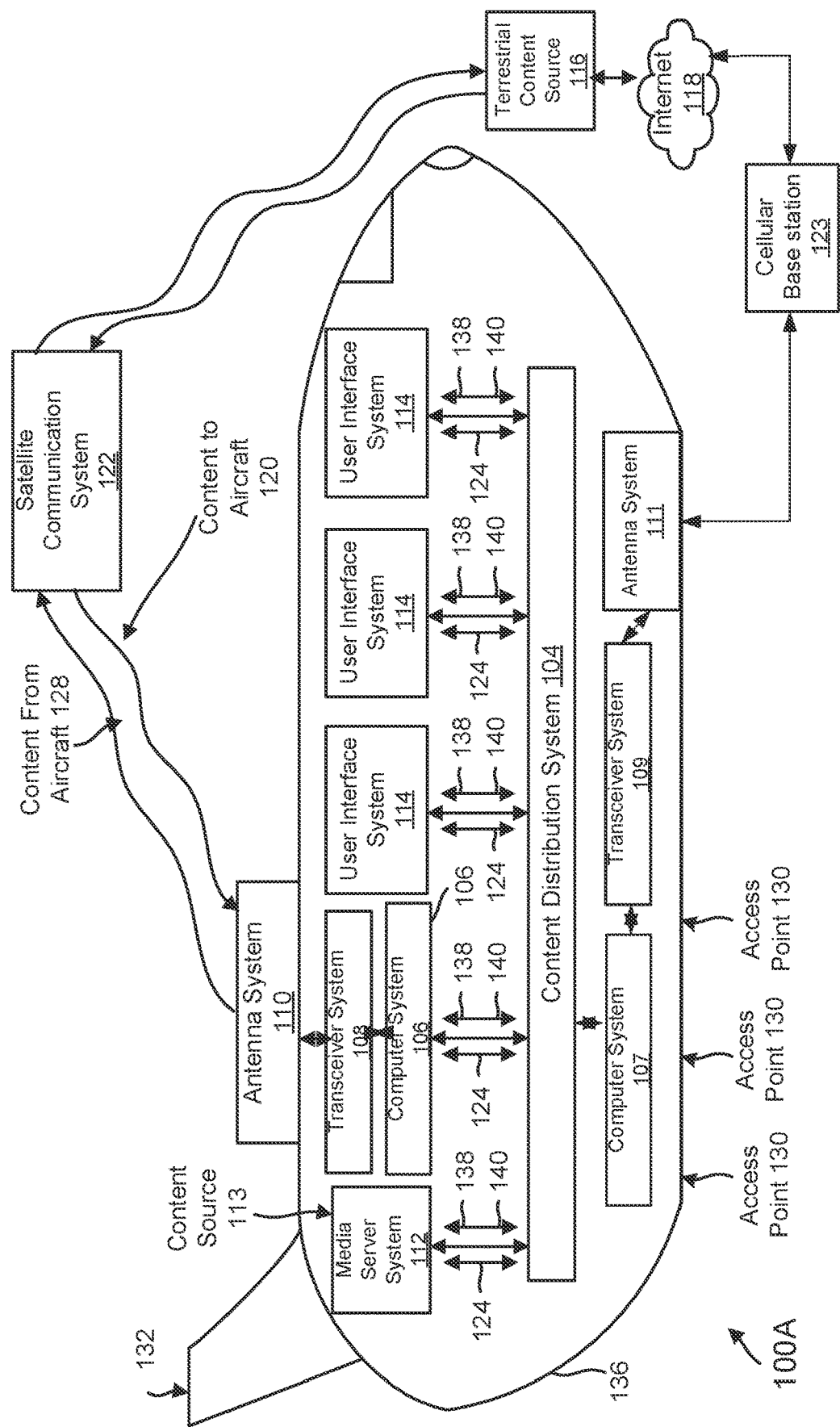
FIG. 1A shows an example of an operating environment for implementing the various aspects of the present disclosure on an aircraft.

In one aspect, innovative computing technology is provided for transportation vehicles including aircrafts. The various examples described herein are based on the innovative technology being deployed on aircrafts but can be implemented on other vehicles including cruise ships, boats, buses, trains, automobiles and other types of vehicles. The term "over-the-top" ("OTT") media content or OTT content means streamed media content, e.g., from a streaming server or streaming service, e.g., NETFLIX, AMAZON INC., DISNEY+, HULU, PARAMOUNT+, PEACOCK, and others (without derogation of any third-party trademark rights). The different streaming services may have different OTT content and may internally use different workflows to deliver the OTT content. The innovative aspects described herein are not limited to any specific OTT content or streaming service.

In one aspect, a ground caching device, may also be referred to as a ground caching server or ground cache is provided. The ground cache receives OTT content from an OTT server. The ground cache can be used by many aircrafts to retrieve OTT content without the network traffic having to leave the private network of the aircraft connectivity supplier, as described below in detail. The aircraft is also provided with an on-board OTT cache that can cache a portion of OTT content received from the ground cache, should the aircraft lose network connectivity, and can also pre-cache a portion of OTT content received from the ground cache, based on a user's known preference or previously stored viewing history. Utilizing both the ground cache and the on-board OTT cache enables the aircraft to present the OTT content on the aircraft. Furthermore, the aircraft cache can be used to provide higher resolution OTT content, when a live OTT content display degrades to a lower resolution due to congestion, as described below in detail.

In one aspect, a user is presented with a portion of OTT content on the aircraft. If the user is not a subscriber to an OTT content service, then the user is presented with an interface to enter information, e.g., an email address. The aircraft in-flight entertainment (IFE) system provides the email address to the OTT content provider to sign up the new user. If the user is an existing user, then the user viewing history is collected such that the viewing history can be used for a next flight or for a different device on ground.

In another aspect, methods and systems for OTT credential management are provided. In one aspect, a personal electronic device ("PED") is logged into an OTT application before a flight. The OTT application stores OTT credentials that a user uses to access OTT content. It is noteworthy that the term "credentials" or "credential" as used throughout this specification includes "authentication tokens," "tokens", "authentication token," or "token," that are used interchangeably throughout this specification. Credentials/tokens include information that can be used to uniquely identify and authenticate a user, an application, device, or both application and device. The terms OTT token and OTT credentials, as well as frequent flyer credentials and frequent flyer token are used interchangeably throughout this application. The various aspects of the present disclosure are not limited based on the usage of the term credential or token.

To watch the OTT content on an aircraft seat device, an airline application executed by the PED links to the OTT application and then pairs the PED with the seat device. The OTT credentials can be transferred to the seat device via a wireless connection between the PED and the seat device. The seat device authenticates the OTT credentials and presents OTT content. In another aspect, if a wireless connection is unavailable, a set device camera captures the OTT credentials, e.g., displayed as a QR code on the PED and stores the OTT credentials to enable a user to view OTT subscriber-only content on the seat device.

In yet another aspect, passenger data is used to enable access to OTT content, while the aircraft has Internet connectivity. Prior to a flight, a passenger logs into an airline frequent flyer account and links OTT credentials with the frequent flyer account or frequent flyer account credentials (can also be referred to as "authentication tokens," "tokens", "authentication token," or "token," used interchangeably throughout this specification)). The frequent flyer account is accessible to an airline application executed by PED. Once on the aircraft, the passenger PED securely pairs with a seat device. The airline application executed by the PED sends the frequent flyer token to the seat device for the IFE system to query the airline's ground system for the linked OTT credentials, which are passed back to the seat for OTT authentication. The seat device may then request a whitelist of OTT servers to securely obtain OTT content, e.g., from the ground cache. The user is presented the OTT content during the flight. After the flight, the OTT credentials are automatically cleared. The usage history is provided to the PED, an OTT server and/or the airline frequent flyer account, such that usage history can be used to enable the user to continue watching OTT content from the previous flight.

In yet another aspect, passenger data is used to enable access to OTT content, in an offline mode i.e., without Internet connectivity during a flight. Prior to the flight, the passenger logs into the airline frequent flyer account and links OTT credentials with the frequent flyer credentials (or token). The frequent flyer account is accessible to an airline application executed by PED. Prior to the flight, either the airline application on the PED retrieves and stores on the PED the OTT credentials or token, or the FF and OTT linked credentials are uploaded to the aircraft. Once on the aircraft, the passenger PED securely pairs with a seat device. The airline application executed by the PED sends the FF token and OTT token if available to the seat device. The seat device looks up the OTT token (i.e., the OTT credentials) with an on-board server if the PED only provided FF credentials. Upon successful authentication, the user is presented the OTT content during the flight. After the flight, the OTT credentials are automatically cleared. The usage history is provided to the PED, an OTT server and/or the airline frequent flyer account, such that usage history can be used to enable the user to continue watching OTT content from the previous flight.

As a preliminary note, the terms "component", "module", "system", and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Vehicle Information System

FIG. 1A shows an example of a generic vehicle information system 100A (also referred to as system 100A) that can be configured for installation aboard an aircraft 132 for presenting OTT content, according to various aspects of the present disclosure. In one aspect, as described below in detail, system 100A uses innovative computing technology of the present disclosure for using a ground cache, managing OTT credentials with or without Internet connectivity, presenting OTT content and using user usage history for a next flight, as described below in detail.

When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, CA., the assignee of this application.

System 100A comprises at least one content source 113 and one or more user (or passenger) interface systems (may also be referred to as a seat device/seatback device/smart monitor) 114 that communicate with a real-time content distribution system 104. The content sources 113 may include one or more internal content sources, such as a media server system 112, that are installed aboard the aircraft 132, one or more remote (or terrestrial) content sources 116 (including OTT content providers) that can be external from the aircraft 132, or a distributed content system. The media server system 112 can be provided as an information system controller for providing overall system control functions for system 100A and/or for storing viewing content 124, including preprogrammed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including storage class memory, optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or the cellular base station 123 that communicates through an antenna 111 to a transceiver system 109, and a computer system 107 (similar to computer system 106). The functionality of computer system 107 is similar to computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. In one aspect, content 120 includes OTT content that is cached on the aircraft and a ground cache (360, FIG. 3A) for passenger consumption. As desired, the terrestrial content source 116 can be configured to communicate with other terrestrial content sources (not shown). The terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system.

In at least one embodiment, the user interface system 114 comprises a software application that a user downloads and installs on a PED to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (338, FIG. 3A) for permitting the user (or also referred to as passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
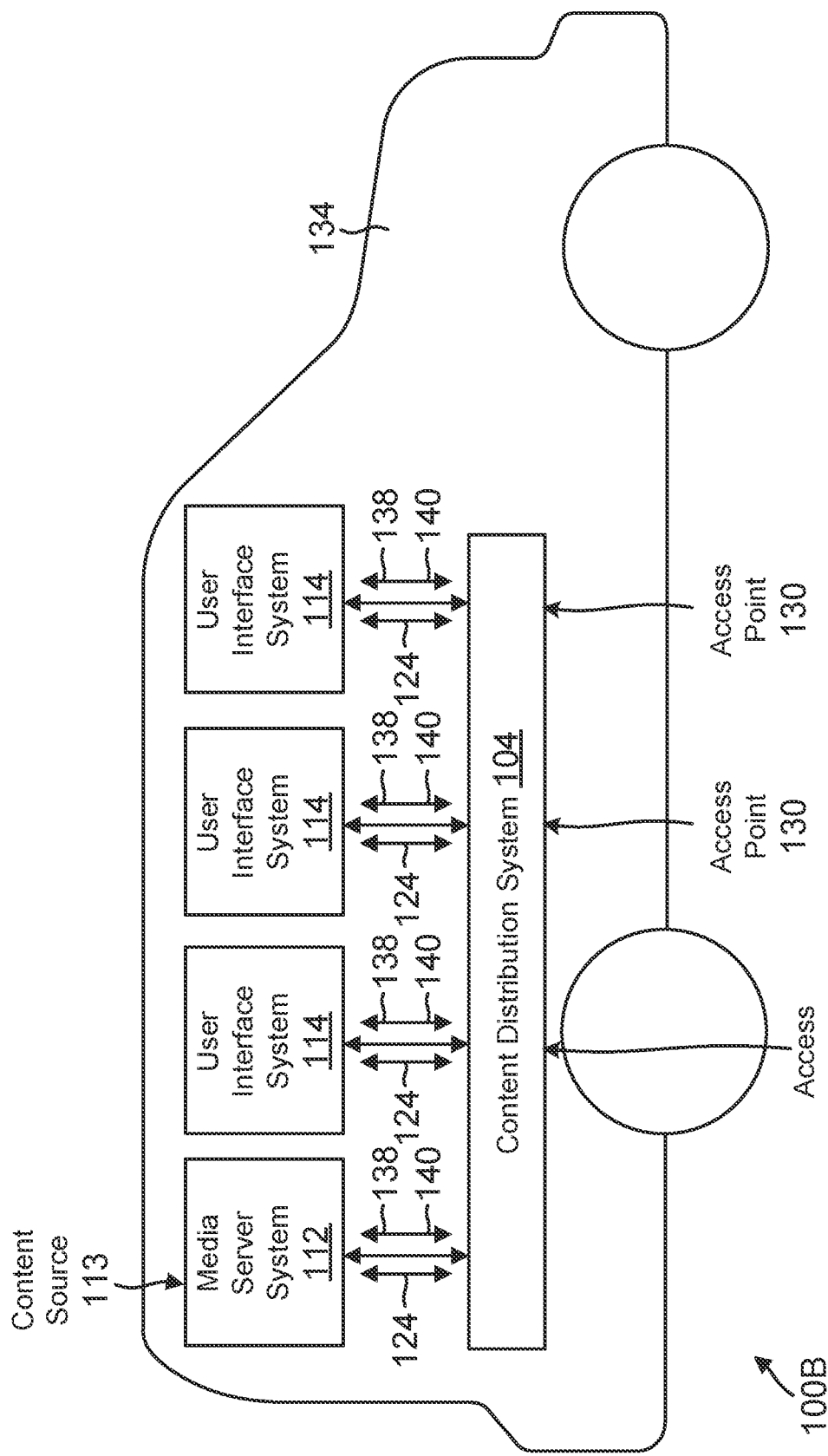
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Content Distribution System

Figure 2:
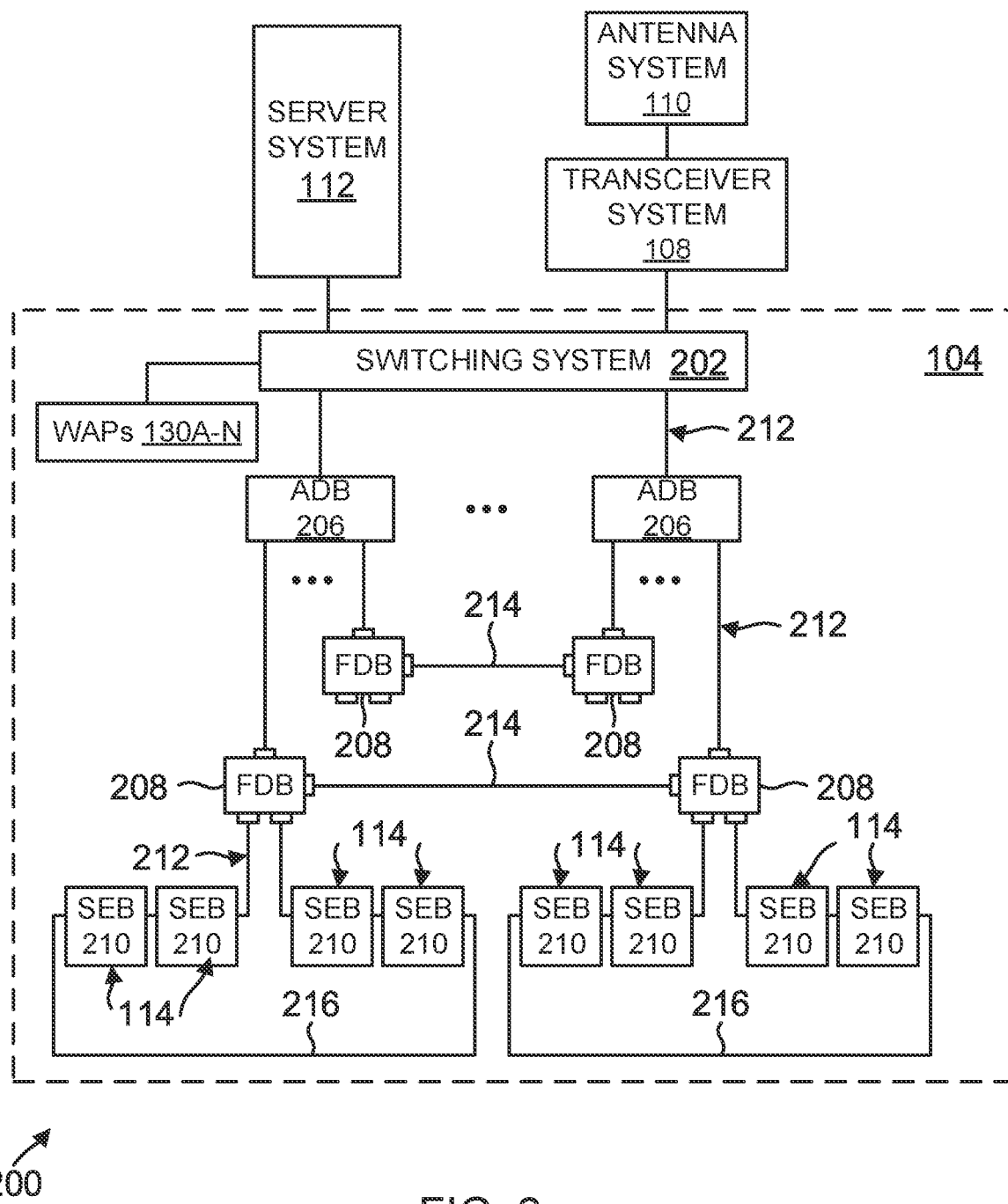
FIG. 2 shows an example of a content distribution system, used according to one aspect of the present disclosure.

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

System 300

Figure 3A:
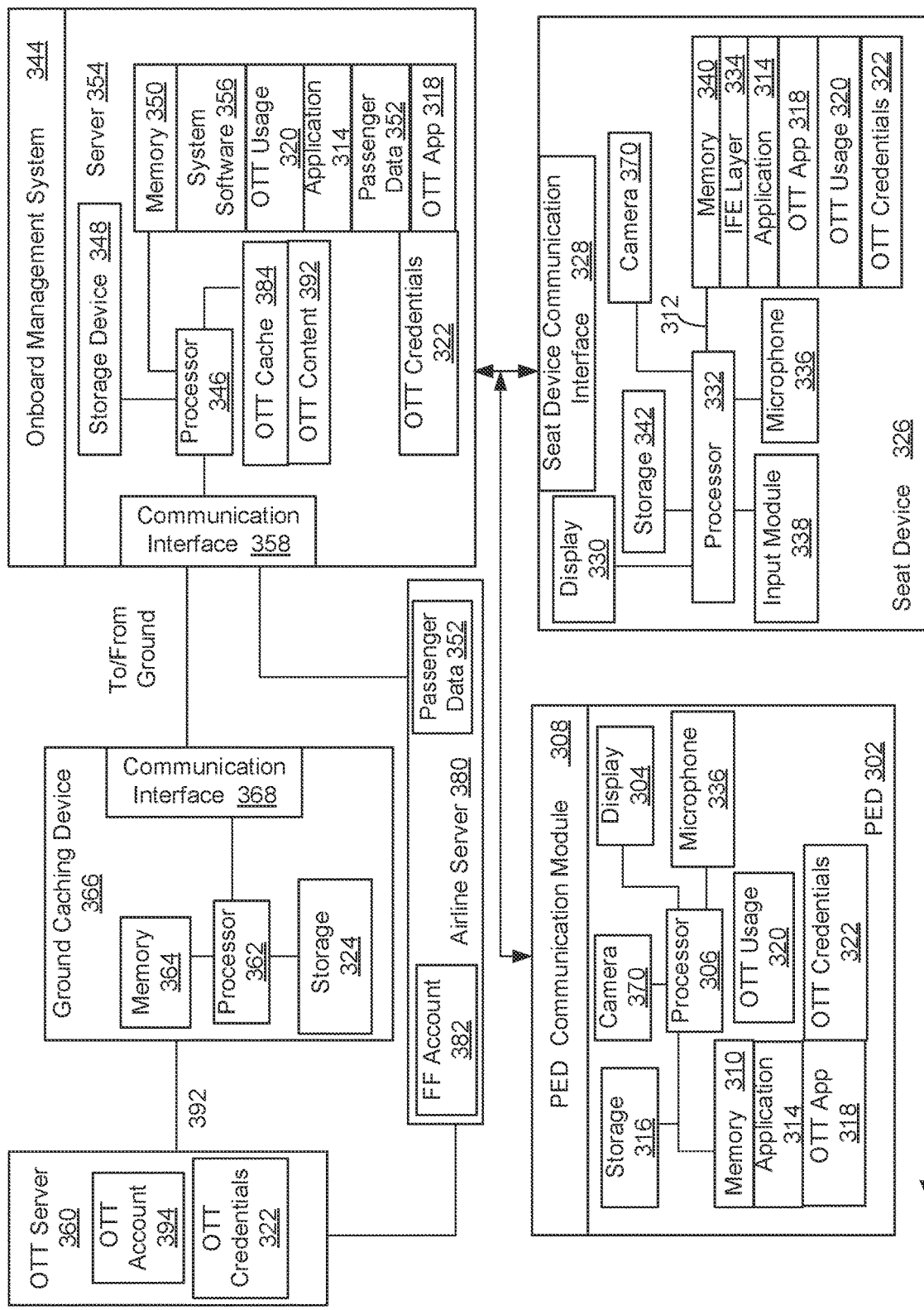
FIG. 3A shows an example of an overall system for managing credentials (or authentication tokens (or "tokens"), used interchangeably throughput this application) to access "over the top" (OTT) media content ("OTT credentials") and distributing the OTT media content to passengers on an aircraft, according to one aspect of the present disclosure.

FIG. 3A shows an example of a system 300 for implementing the innovative computing technology for presenting OTT content, managing OTT credentials, and using OTT content usage history between flights, according to various aspects of the present disclosure, described below in detail. In one aspect, system 300 includes an onboard management system 344, a seat device 326, a PED 302, a ground caching device (also referred to as caching server 366 or cache 360) that receives OTT content 392 from a whitelisted OTT server 360 and an airline server 380. The airline server 380 maintains a user frequent flyer account 382 and uploads passenger data 352 with a frequent flyer token that is linked with OTT credentials. The OTT server 360 maintains an OTT account 394 for each user. The account can be accessed by using OTT credentials 322. The OTT credentials 322 include a user identifier, a password, user biometric information, multi-factor authentication, custom tokens or any other means.

The OTT content 392 received from the OTT server 360 is repackaged into IFE media format, e.g., as defined by Digital Media Encoding Specification" for audio/video products. The OTT content metadata may also be updated to track usage on the aircraft and include encryption keys for secure presentation of the media content.

In one aspect, the onboard management system 344 includes a server 354 (similar to the media server 112 and/or computer system 106/107). The server 354 includes a processor 346 that has access to a memory 350 via a bus system/interconnect (similar to the interconnect 312 on seat device 326 described below in detail). The interconnect may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 includes one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to storage (or storage device) 348 that may be used to store data (for example, passenger data 352 with a frequent flyer token, OTT usage (or viewing history) 320 (may also be referred to as data structure 320), OTT credentials 322, OTT content 392, applications, and program files, including system software 356, an application 314 (also referred to as an airline application), OTT application 318, and others. The use of OTT application 318, OTT credentials 322, and passenger data 352 are described below in detail. Storage 348 includes one or more magnetic or optical based disks, storage class memory, solid-state drive or any other storage device type.

In one aspect, the OTT content 392 received from the ground caching device 366 is cached or temporarily stored in an OTT cache 384 before being presented by the seat device 326 and/or the PED 302. The amount of OTT content that can be stored at OTT cache 384 depends on the size of the cache and whether the OTT content 392 is compressed.

In one aspect, application 314 may be downloaded from server 354 by passengers using an authorized PED 302 for accessing digital content. The OTT application 318 may also be made available to the seat device 326 and/or the PED 302 from server 354 via a network connection or from OTT server 360. The OTT application 318 may be provided by an OTT content provider, customized for the aircraft operating environment, while the application 314 may be provided by an airline and/or an IFE provider.

In one aspect, system software 356 is executed by the processor 346 to control the overall operation of the server 354.

In one aspect, the onboard management system 344 maintains flight and passenger data 352 (may also be referred to as data 352 or passenger manifest), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, and any other information that can uniquely identify the passengers. Data 352 may be retrieved from a ground system (not shown) before flight departure. Data 352 may include passenger frequent flyer credentials (e.g., a token) that can be linked with OTT credentials 322 (e.g., 386, FIG. 3D). The frequent flyer credentials are used by PED 302 or the seat device 326 to access a user frequent flyer account (e.g., 382) that is maintained by an airline or an authorized third party. This enables the seat device 326 to authenticate OTT credentials 322 on the aircraft, when the aircraft may have limited (i.e., slow) or no Internet connectivity, as described below in detail.

In one aspect, server 354 communicates with the ground caching device 366, airline server 380, PED 302 and/or seat device 326 via a communication interface 358. The communication interface 358 may be used to receive information from the ground, for example, data 352 with frequent flyer credentials linked with OTT credentials 322 and OTT content 392 that is cached at OTT cache 384. The communication interface 358 includes one or more interfaces for a wired and/or wireless connection, as described above with respect to FIGS. 1A/1B and 2.

In one aspect, the seat device 326 includes a display device 330 to display the OTT content 392, a processor 332, a memory 340, a seat device communication interface (also referred to as communication interface) 328 and storage (or storage device) 342 for storing content. Storage 342 stores content in a non-volatile manner, and includes one or more magnetic or optical based disks, storage class memory, flash memory, solid-state drive or any other storage device type. The seat device 326 may optionally include a camera 370 and a microphone 336. The camera may be used to take a picture, e.g., of a QR code representing OTT credentials 322, as described below in detail, and the microphone 366 can be used for receiving a voice input to activate camera 330.

In one aspect, the seat device 326 receives user input/requests via an input module 338. The input module 338 may be configured to use a local touch screen included with display 330, a local virtual keyboard, an external mouse, external keyboard or any other input device.

In one aspect, the seat device 326 stores OTT content usage i.e., viewing history of the OTT content 392 in data structure 320. Data structure 320 identifies OTT content by a unique identifier, the time OTT content viewing started, the time when the content viewing was stopped, the user OTT account identifier, a frequent flyer account identifier, or any other information. This information enables the passenger to resume watching OTT content on a next flight or on the ground on a different device, after the flight ends as described below.

In one aspect, processor 332 has access to memory 340 via an interconnect (or bus system) 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The interconnect 312 is an abstraction that represents any one or more separate physical buses and/or point-to-point connections, connected by appropriate bridges, adapters and/or controllers. The interconnect 312, therefore, may include, for example, a system bus, a Peripheral Component Interconnect (PCI) bus, a PCI-Express bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, memory 340 stores application 314, OTT application 318, and OTT credentials 322 that are accessed by the processor 332. This information can be stored in storage 342 and then moved to memory 340 when the processor 332 needs access.

In one aspect, processor 332 also executes an IFE layer 334 out of memory 340. The IFE layer 334 provides in-flight entertainment and other options to users. The IFE layer 334 provides audio/video content as well as controls for accessing the content, including the OTT content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In one aspect, the seat device 326 executes the application 314 that may be used by the passenger to view content or enable various computing functions. The application 314 when executed by the seat device 326 may have different functionality compared to when application 314 is executed by the PED 302.

In another aspect, the seat device 326 also executes the OTT application 318. This enables the seat device 326 to authenticate OTT credentials 322 that are received from PED 302.

The seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the PED 302 may be a mobile phone, a notebook, a tablet, a laptop or any other computing device. The PED 302 is securely paired with the seat device 326 using application 314 to access the functionality offered by the seat device 326. The term "pair", and other grammatical forms such as "pairing", means that the PED 302 is associated with a particular passenger seat such that communications received by seat device 326 from the PED 302 are recognized as being related to that passenger seat and/or such communications control seat functions associated with a passenger seat and controlled by a seat function controller. The term automatic as associated with pairing means that the PED is paired with minimal passenger involvement.

As an example, PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may include a microphone 336 for receiving a voice input from a passenger. In another aspect, PED 302 also includes a camera 370 that may be used by a passenger to upload a video.

Processor 306 has access to storage (or storage device) 316 that includes any storage medium for storing data in a non-volatile manner, such as one or more magnetic or optical based disks, storage class memory, flash memory, or solid-state drive. The storage device 316 may be used to store content displayed on a display 304 of PED 302 when used by a passenger. In one aspect, display 304 may also include a touch screen for receiving input commands.

The storage device 316 may also store the application 314 and/or the OTT application 318 executed out of memory 310. Application 314 may be used to pair the PED 302 with seat device 326 to receive OTT content, OTT usage 320 and communicate with the seat device 326. As an example, the OTT application 318 is provided by an OTT provider, e.g., an entity that controls OTT content stored by the OTT server 360. Details of using the OTT application 318 and application 314 are provided below.

Furthermore, as an example, application 314 (and/or OTT application 318) may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with the seat device 326. In one aspect, the PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, server 354 communicates with the ground caching device 366 via a network connection. The network connection can be a satellite-based network connection or use any other technology. The ground caching device 366 may include a processor 362 that has access to a memory 364 via a bus system/interconnect (similar to 312) for executing stored instructions. The bus system may represent any one or more separate physical buses and/or point-topoint connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

The ground caching device 366 may also include a storage (or storage device) 324 that may be or may include any storage medium for storing data in a non-volatile manner, such as one or more magnetic or optical based disks, flash memory, or solid-state drive. The storage device 316 may be used to store OTT media content 392 received from the OTT server 360 via a network interface (not shown). In one aspect, the OTT content 392 is pre-fetched based on viewing history of a passenger. The viewing history is maintained for each passenger by the airline server 380 or any other system.

As an example, the OTT content 392 includes a media file and metadata associated with the media file. For example, the metadata may include a time stamp when the OTT content is received, the size and type of media file, ownership information (e.g., licensor and licensee information), information indicating a type of encryption or encoding that may have been used to protect the media file, a part number, a version number, or any other parameter. In one aspect, the OTT content 392 can be configured to operate as an independent media loadable unit (MPU) i.e., the media content 392 can be processed independently without relying on another MPU or sub-MPU.

In one aspect, the OTT content 392 received from the OTT server 360 is repackaged as IFE content either by processor 362 of the ground caching device or any other computing device. The repackaged OTT content is uploaded to server 354 via communication interface 368. It is noteworthy that although a single block is shown for the communication interface 368 for convenience, the communication interface may have different interface, cards, logic and circuitry to comply with the different communication protocols/standards.

Credential Management System

Figure 3B:
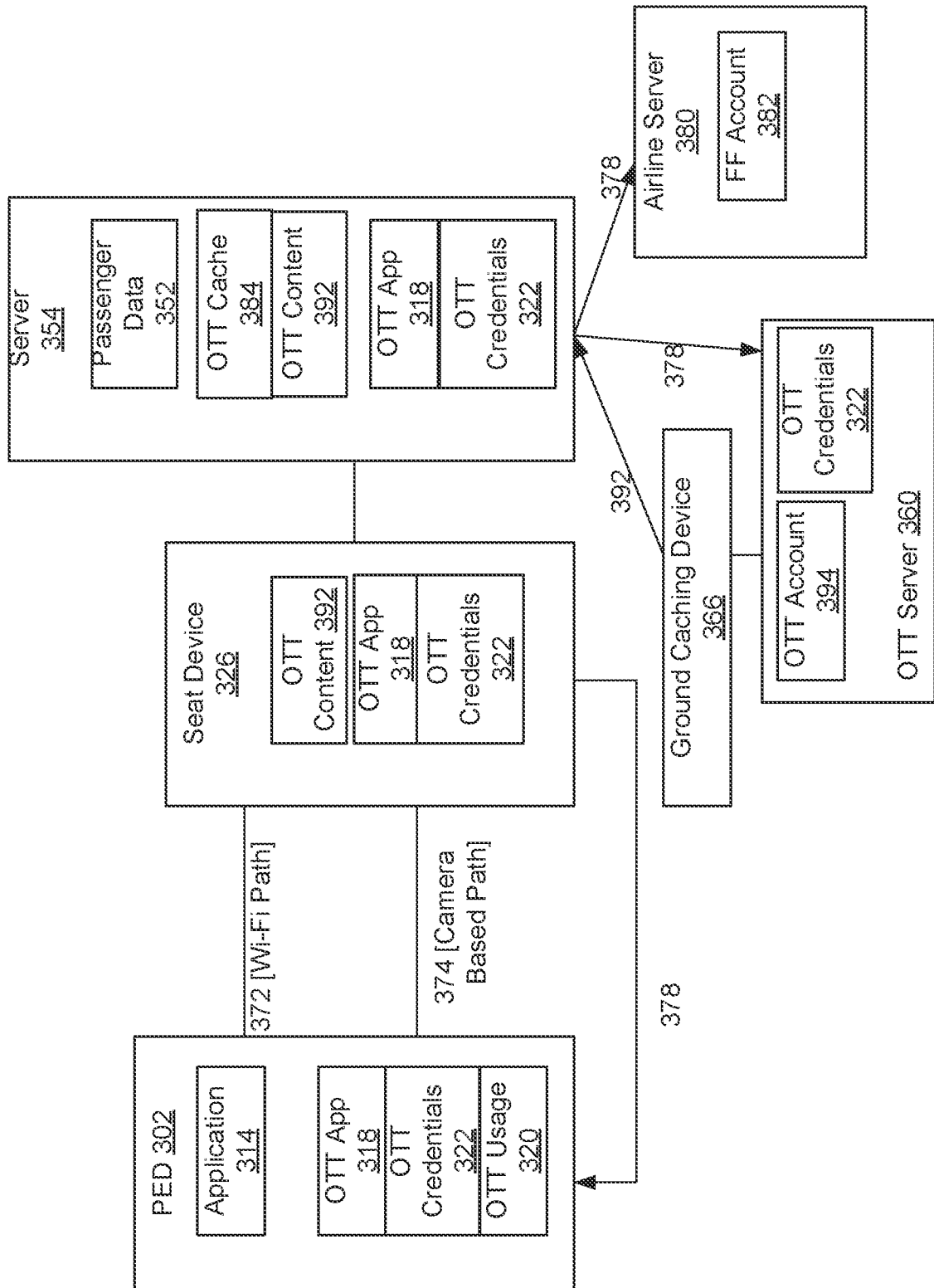
FIG. 3B shows a block diagram of a system for transferring OTT credentials via a wireless network connection, according to one aspect of the present disclosure.

FIG. 3B shows an example of an OTT credential management system on an aircraft using a wireless connection for a first path 372 or using the seat device camera 370 in a second path 374, according to one aspect of the present disclosure. Prior to using either path 372 or 374, PED 302 executing application 314 obtains access to OTT credentials 322. This maybe enabled by logging to the OTT account 394 maintained by the OTT server 360 from the application 314. The OTT credentials 322 for logging into the OTT account 394 are then made available to the application 314. In another aspect, data sharing between application 314 and OTT application 318 is enabled and application 314 can access OTT credentials 322 from PED 302.

When the passenger boards the aircraft, PED 302 is securely paired with the seat device 326 via a wireless connection using the path 372. The PED 302 is authenticated by the seat device 326 and OTT credentials 322 are made available to the seat device 326 via path 372. The seat device 326 can store the OTT credentials 322 to enable OTT content access. The OTT credentials 322 are cleared after the flight is over to maintain passenger privacy and security.

If a wireless connection is unavailable, the seat device camera 370 can be used to capture the OTT credentials 322, e.g., within a QR code, using path 374. After the PED 302 is securely paired with the seat device 326, the QR code is displayed by the application 314. Camera 370 collects OTT credentials 322 from PED display 304 and stores the OTT credentials 322 for the seat device 326 in storage 342. The OTT credentials 322 are cleared after the flight is over to maintain passenger privacy and security.

Online Credential Management System

Figure 3C:
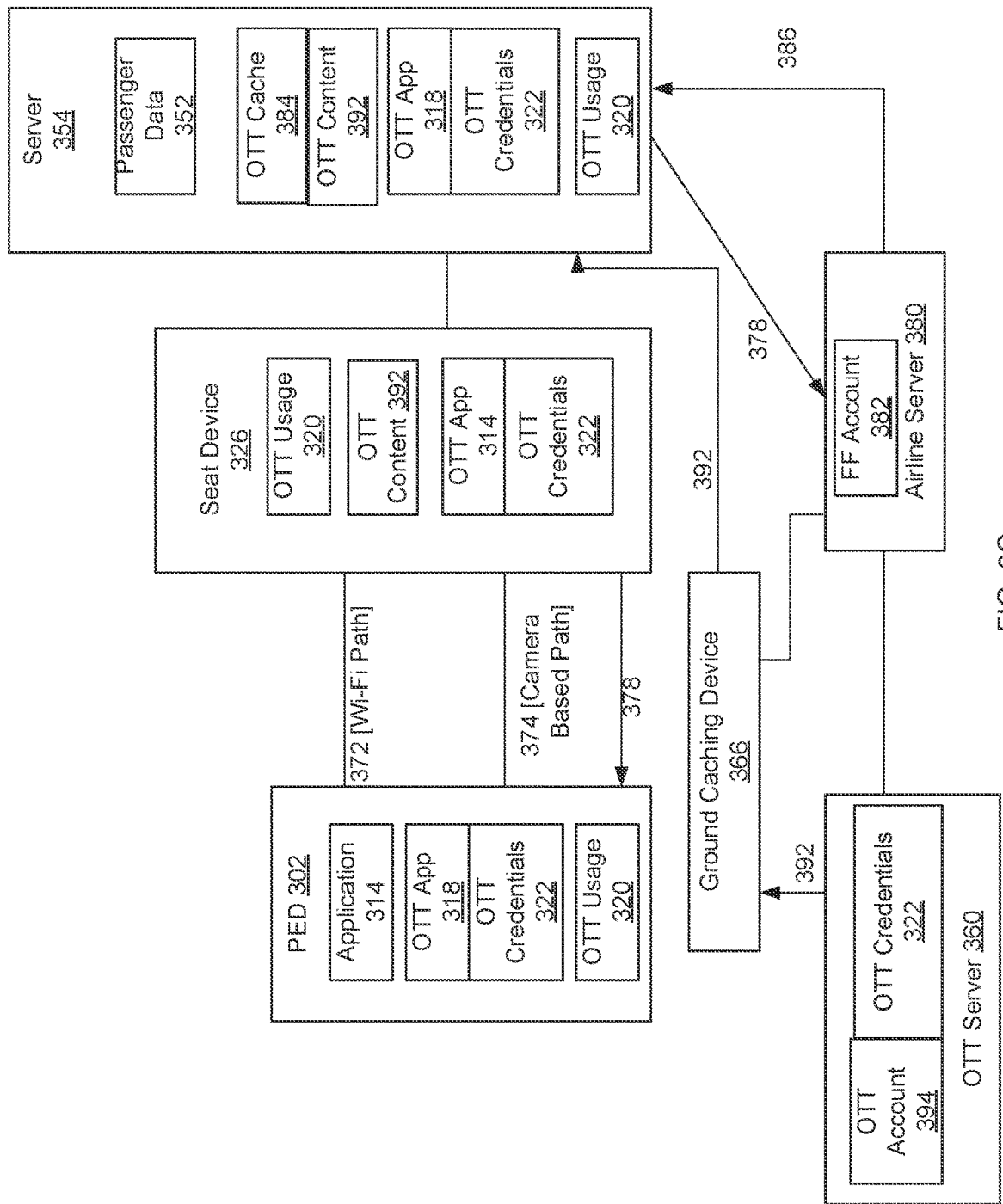
FIG. 3C shows a block diagram of a system for transferring OTT credentials via a seat device camera, according to one aspect of the present disclosure.

FIG. 3C shows an example of a system for managing OTT credentials using passenger data 352 while an aircraft has Internet connectivity during a flight, according to one aspect of the present disclosure. Before the flight, the passenger using application 314 logs into the frequent flyer account 382 that is maintained by the airline server 380. The frequent flyer account 382 tracks passenger specific data. The frequent flyer account 382 is linked with the OTT account 394 that is maintained by the OTT server 360. In another aspect, application 314 and OTT application 318 share credentials (or authentication tokens) that can be used to login to the OTT account 394 and the frequent flyer account 382. The frequent flyer account credentials (or token) 386 linked with OTT credentials are also made available to server 354 (and/or seat device 326) by the airline server 380.

Once the passenger is on the aircraft, the passenger PED 302 is securely paired with seat device 326 using application 314. To access OTT content or account, the frequent flyer credentials (i.e., token) 386 are provided to the seat device 326. The seat device 326 via server 354 uses the frequent flyer credentials 386 to query the airline server 380 to obtain the OTT credentials 322 from the airline server 380. The OTT credentials 322 are stored by the seat device 326 and/or server 354. It is noteworthy that OTT credentials 322 may also be stored at the ground caching device 366. Furthermore, based on the user history available via the frequent flyer account 382, the ground caching device 366 prefetches passenger favored OTT content 392 from the OTT server 360. The prefetched OTT content 392 is made available to the seat device 326 via the OTT cache 384.

After the flight is over, the OTT credentials 322 (and any associated token) including frequent flyer credential 386 are cleared from all storage locations, for example, the seat device 326, server 354 and the ground caching device 366. The OTT usage 320 (i.e., the OTT content viewing history) is provided to the airline server 380 (shown as 378) and/or PED 382, after the flight. The viewing history from a first flight can be used on a second flight so that the passenger can resume watching the OTT content from the first flight or on a different device, if the first flight is the only flight.

Offline OTT Credential Management System

Figure 3D:
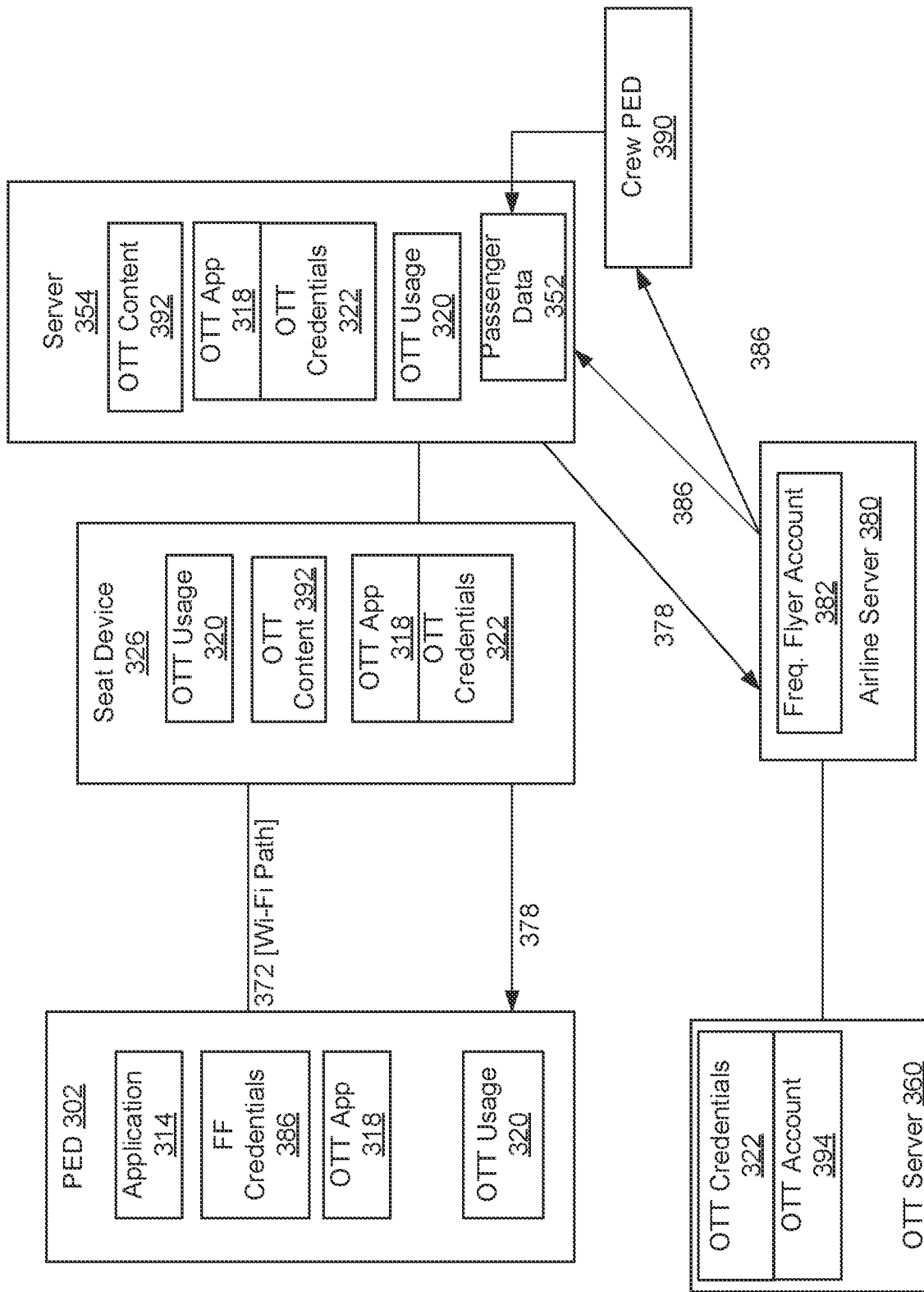
FIG. 3D shows a block diagram of a system for transferring OTT credentials using an aircraft network connection with ground, according to one aspect of the present disclosure.

FIG. 3D shows an example of a system for managing OTT credentials using passenger data 352 while an aircraft has no Internet connectivity with the airline server 380, according to one aspect of the present disclosure. Before a flight, a user logs into the frequent flyer account 382 maintained by the airline server 380. The frequent flyer account 382 is linked to the OTT account 394. In one aspect, the frequent flyer credentials 386 are linked with OTT credentials 322 to access OTT content during the flight. In another aspect, application 314 and OTT application 318 enable data/credential sharing. The airline server 380 uploads frequent flyer credentials (or a token) 386 linked with OTT credentials 322 to server 354 and/or a crew PED 390 with passenger data 352, before each flight. The frequent flyer credentials (or a token) 386 and the OTT credentials 322 may also be stored on the PED 302.

Once the passenger is on the aircraft, PED 302 is securely paired with seat device 326 by application 314. The frequent flyer credentials 386, and if available on the PED 302, the OTT credentials 322 are provided to the seat device 326. If the PED 302 only provides the frequent flyer credentials 386, the seat device 326 uses the frequent flyer credentials 386 to obtain the OTT credentials from server 354 from the uploaded passenger data 352. The seat device 326 enables access to OTT content 392 at seat device 326.

After the flight is over, the OTT credentials 322 are cleared from all storage locations, for example, the seat device 326, and/or server 354. The OTT usage 320 (i.e., the viewing history) is provided to the airline server 380 (shown as 378) and/or PED 302, after the flight. The viewing history from a first flight can be used on a second flight so that the passenger can resume watching OTT content from the first flight or on a different device, if the first flight is the only flight.

Process Flows

FIGS. 4A-4E and 5A-5B show various process flows using the various components that have been described above with respect to FIGS. 3A-3D. In the various figures, the process blocks are illustrated in a certain sequence, however, the process blocks may be executed out of sequence. The various adaptive aspects of the present disclosure are not limited to any specific process flow sequence.

Ground Caching Device Usage

Figure 4A:
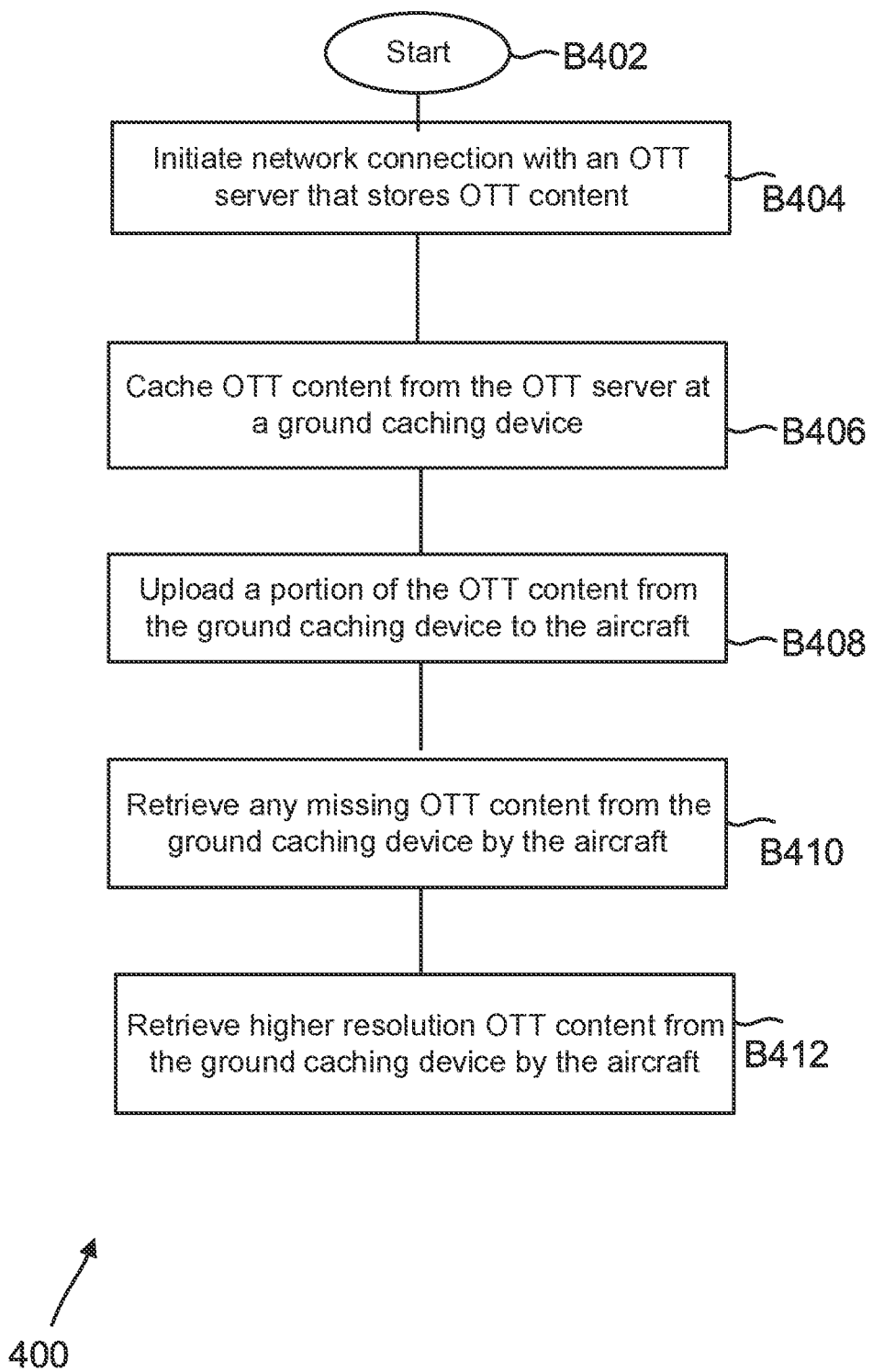
FIG. 4A shows a process flow diagram for using a ground caching device to deliver OTT media content to an aircraft, according to one aspect of the present disclosure.

FIG. 4A shows a process 400 for using the ground caching device 366 and the OTT cache 384 described above with respect to FIGS. 3A-3D, according to one aspect of the present disclosure. Process 400 begins in block B402, when the OTT server 360 and the ground caching device 366 are operational.

In block B404, a secured network connection between the ground caching device 366 and the OTT server 360 is established.

In block B406, OTT content 392 from OTT server 360 is cached at the ground caching device 366.

In block B408, a portion of the OTT content 392 is uploaded to an aircraft. The amount of uploaded OTT content will depend on the overall storage capacity available at the aircraft for example, the storage capacity of the OTT cache 384. In one aspect, OTT content 392 is "pre-fetched" for a user, whose profile and viewing history is used to predict content that the user may view. By pre-fetching the content, process 400 reduces latency in delivering the OTT content 392 to the user device (i.e., PED 302 and/or seat device 326).

When a passenger begins viewing the OTT content on the aircraft, and the aircraft has network connectivity, any missing content can be retrieved from the ground caching device 366 in block B410. Furthermore, in block B412, when low-resolution content is presented to the seat device 326 due to network congestion, high resolution OTT content is retrieved from the OTT cache 384 and/or the ground caching device 366 that may have more storage capacity than the OTT cache 384 on the aircraft.

New Subscriber Sign-up

Figure 4B:
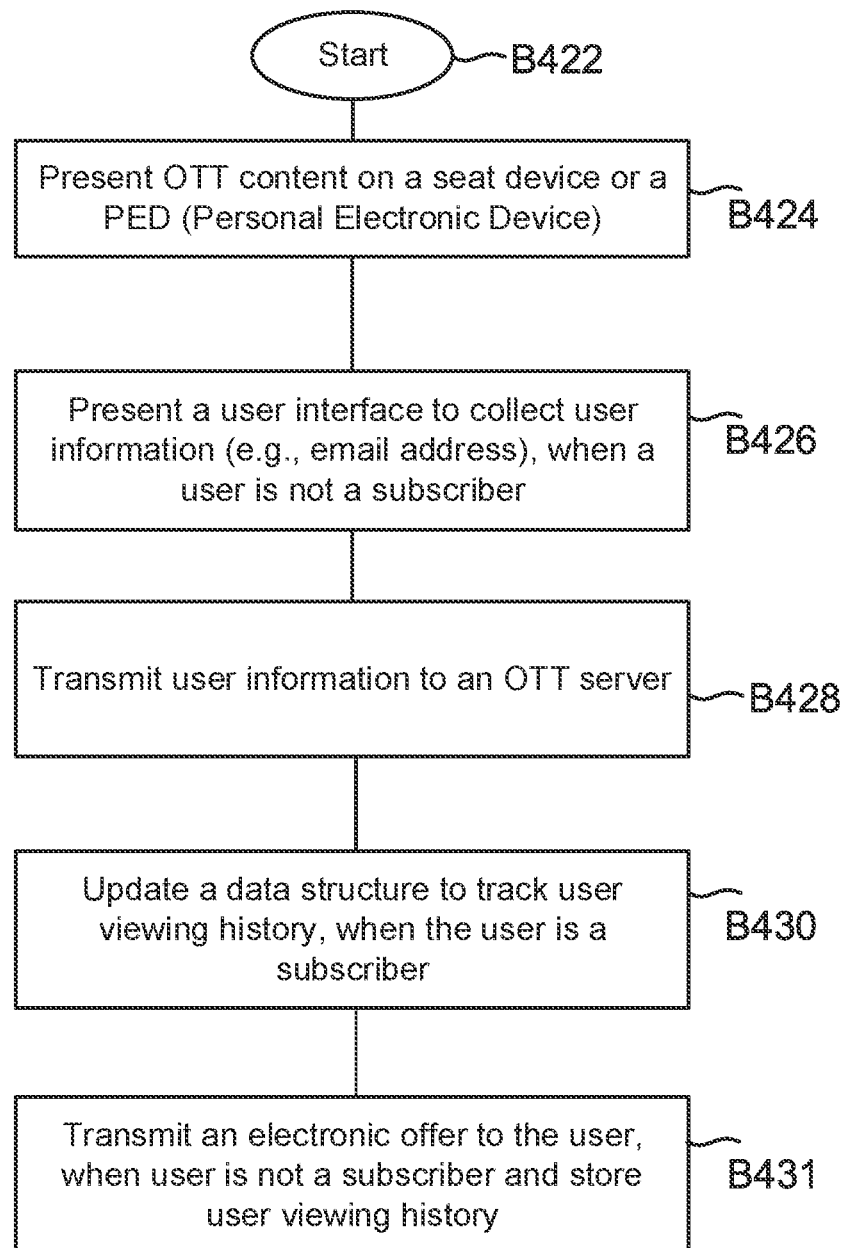
FIG. 4B shows a process flow diagram for signing up users on an aircraft for OTT content, according to one aspect of the present disclosure.

FIG. 4B shows a process 420 for adding new subscribers and managing usage history of existing subscribers of OTT content watched on an aircraft, according to one aspect of the present disclosure. Process 420 begins in block B422, after a user has been authorized to watch OTT content 392 either on a PED 302 or a seat device 326 on an aircraft.

In block B424, the OTT content is presented to the user either on the PED 302 or the seat device 326. In one aspect, the OTT application 318 first determines whether the user is a subscriber by sending an inquiry to the OTT server 360. In another aspect, the airline server 380 is notified by the OTT server 360 of users that are subscribers, and since the airline server 380 maintains all passenger data, it notifies the server 354 and/or the seat device 326 of passengers that are subscribers and non-subscribers of OTT content.

In one aspect, a first subset (e.g., first episode of a N episode series) of the OTT content 392 is presented to a non-subscriber and a second subset in presented to a subscriber. The second subset maybe greater than the first portion or may be equal.

In block B426, for the non-subscriber, the presentation of the first subset is interrupted on the seat device 326, and a user interface is presented to collect user information for example, a user email address. The user is also asked if they want to subscribe to the OTT content via the user interface.

In block B428, the collected user information (e.g., the email address) is sent to the OTT server 360 from the aircraft.

In block B430, if the user is already a subscriber, data structure 320 is updated to track user viewing history. Data structure 320 can be used to enable the user to resume watching the OTT content from a first flight to another flight, or on the ground at another device. Furthermore, in block B431, the OTT server 360 may send an electronic offer (e.g., via email or text) to the user, when the user is not a subscriber. Data structure 320 for the non-subscriber user is also updated and stored such that the viewing history can be used if the user becomes a subscriber.

In one aspect, novel computing technology executing a method is provided. The method includes caching, by a ground-based caching device (366), media content (392) provided by a streaming service; pre-fetching, by a server (e.g., 354) on an aircraft, a portion of the cached media content that is likely to be viewed by passengers on the aircraft, the pre-fetched content stored in a cache (e.g., 384) on the aircraft; presenting, to a first device (e.g. 326) on the aircraft, a first subset of the pre-fetched content to a non-subscriber of the media content on a first flight; presenting, to a second device (e.g. another seat device 326) on the aircraft, a second subset of the pre-fetched content to a subscriber of the media content on the first flight; interrupting, at the first device, presentation of the first subset to request information regarding the non-subscriber; and storing, by the second device, viewing history (e.g. OTT usage 320) of the second portion by the subscriber. The viewing history of the subscriber is used on a second aircraft on a second flight to resume presentation of the second subset of the media content.

Credential Management Using Wireless Connection

Figure 4C:
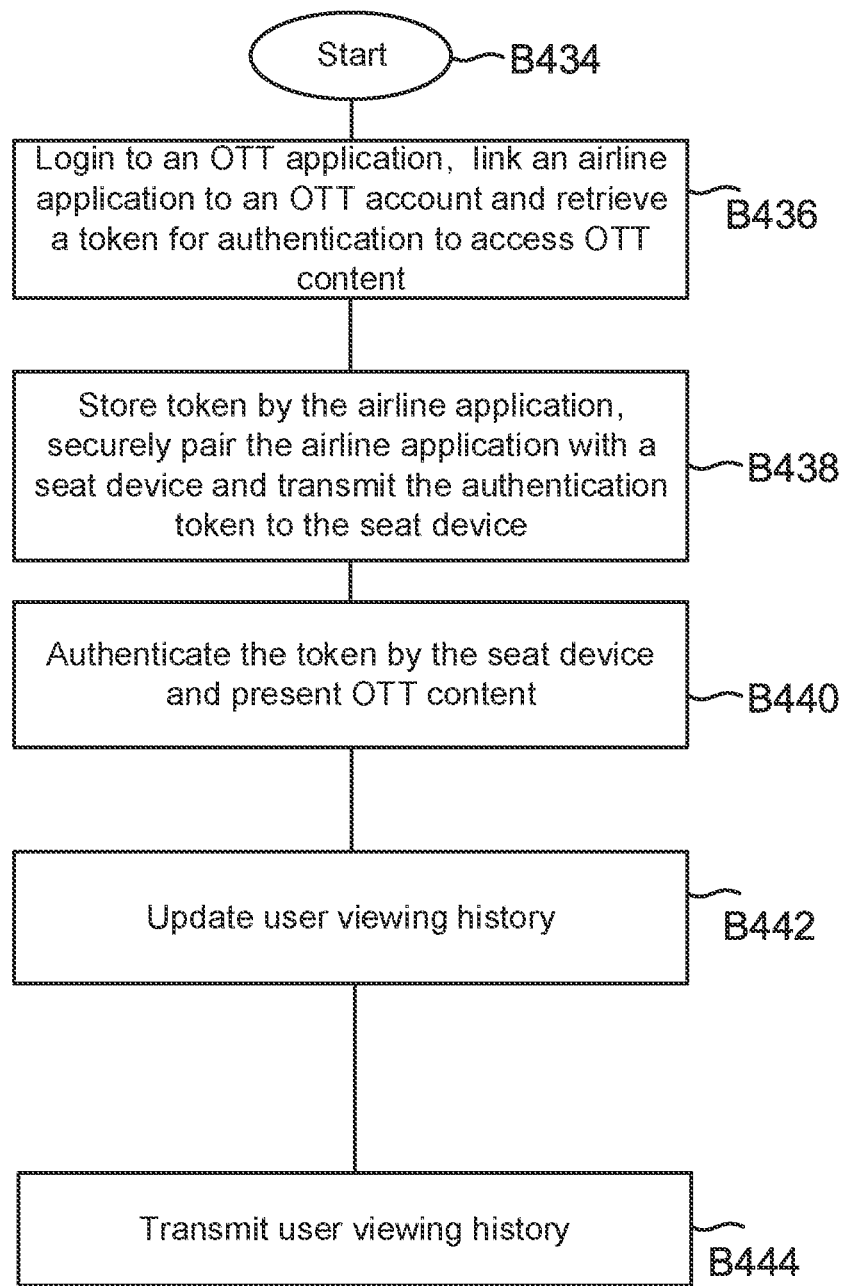
FIG. 4C shows a process flow diagram for transferring OTT credentials to a seat device via a wireless connection on an aircraft, according to one aspect of the present disclosure.

FIG. 4C shows a process 432 for transferring OTT credentials from a PED 302 to a seat device 326 on an aircraft using a wireless connection, according to one aspect of the present disclosure. Process 432 begins in block B434, when PED 302 is initialized and operational before a flight. In block B436, a passenger using a PED 302 logs into the OTT application 318 using OTT credentials 322. Application 314 is linked with an OTT account 394 to retrieve a token that can be used to access OTT content, as described below. In another aspect, when enabled, application 314 and OTT application 318 automatically share data and credentials for logins.

In block B438, the application 314 stores the retrieved token in storage 316. Application 314 then securely pairs the PED 302 with the seat device 326. The PED 302 transmits the stored token to the seat device 326 via a wireless connection using path 372.

In block B440, the seat device 326 authenticates the token and enables access to OTT content 392. In one aspect, the OTT application 318 executed by the seat device 326 authenticates the received token. As described above, the OTT content can be retrieved from the OTT cache 384 and the ground caching device 366. In one aspect, OTT content 392 can be pre-fetched from the ground caching device 366 or the OTT cache 384, based on previous viewing history of the user.

In block B442, the seat device 326 updates the viewing history of the OTT content. In one aspect, the token received from PED 302 is updated with the viewing history and stored in data structure 320. The viewing history includes an identifier that identifies an OTT content file, the time the user begins to watch the OTT content, and a file location when the user stops watching the content or any other information.

In block B444, the usage history is transmitted to the PED 302, the OTT server 360 and/or the airline server 380. This enables the user to begin viewing the OTT content from where they left off on a next flight and/or a different device after the flight ends.

Credential Management Via Seat Device Camera

Figure 4D:
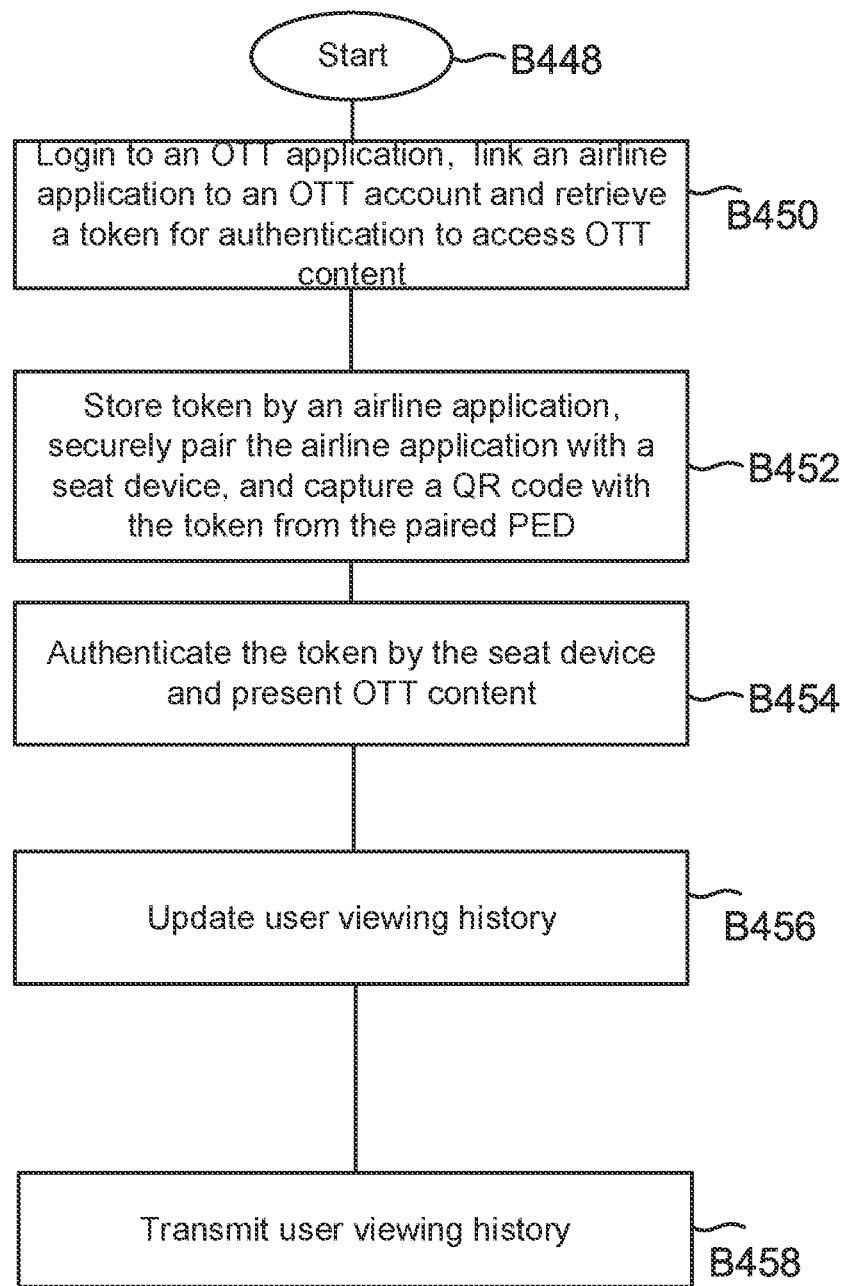
FIG. 4D shows a process flow diagram for transferring OTT credentials to a seat device via a seat device camera on an aircraft, according to one aspect of the present disclosure.

FIG. 4D shows a process 446 for managing OTT credentials on an aircraft using a seat device camera 370, according to one aspect of the present disclosure. Process 446 begins in block B448, when PED 302 is initialized and operational before a flight.

In block B450, a passenger using PED 302 logs into the OTT application 318 using OTT credentials 322. Application 314 is linked with an OTT account 394 to retrieve a token that can be used to access OTT content, as described below. In another aspect, when enabled, application 314 and OTT application 318 automatically share data and credentials for logins.

In block B452, application 314 stores the token in storage 316. Application 314 then pairs the PED 302 with the seat device 326. Instead of using a wireless connection to transfer the token, the seat device 326 camera 370 captures an image of a QR code that represents (or includes) the token (or OTT credentials 322). The captured image is authenticated by the seat device 326 in block B454 using the OTT application 318 and access to OTT content 392 is enabled. As described above, the OTT content can be retrieved from the OTT cache 384 and the ground caching device 366. In one aspect, OTT content can be pre-fetched from the ground caching device 366 or the OTT cache 384, based on previous viewing history of the user.

In block B456, the seat device 326 updates the viewing history of the OTT content by the user. In one aspect, the token received from PED 302 is updated with the viewing history and stored in data structure 320. The viewing history includes an identifier that identifies a specific OTT content file, the time the user begins to watch the OTT content, and a file location when the user stops watching the content or any other information.

In block B458, the usage history is transmitted to the PED 302, the OTT server 360 and/or the airline server 380. This enables the user to begin viewing the OTT content from where they left off on a next flight and/or a different device after the flight ends.

Online OTT Content Access

Figure 4E:
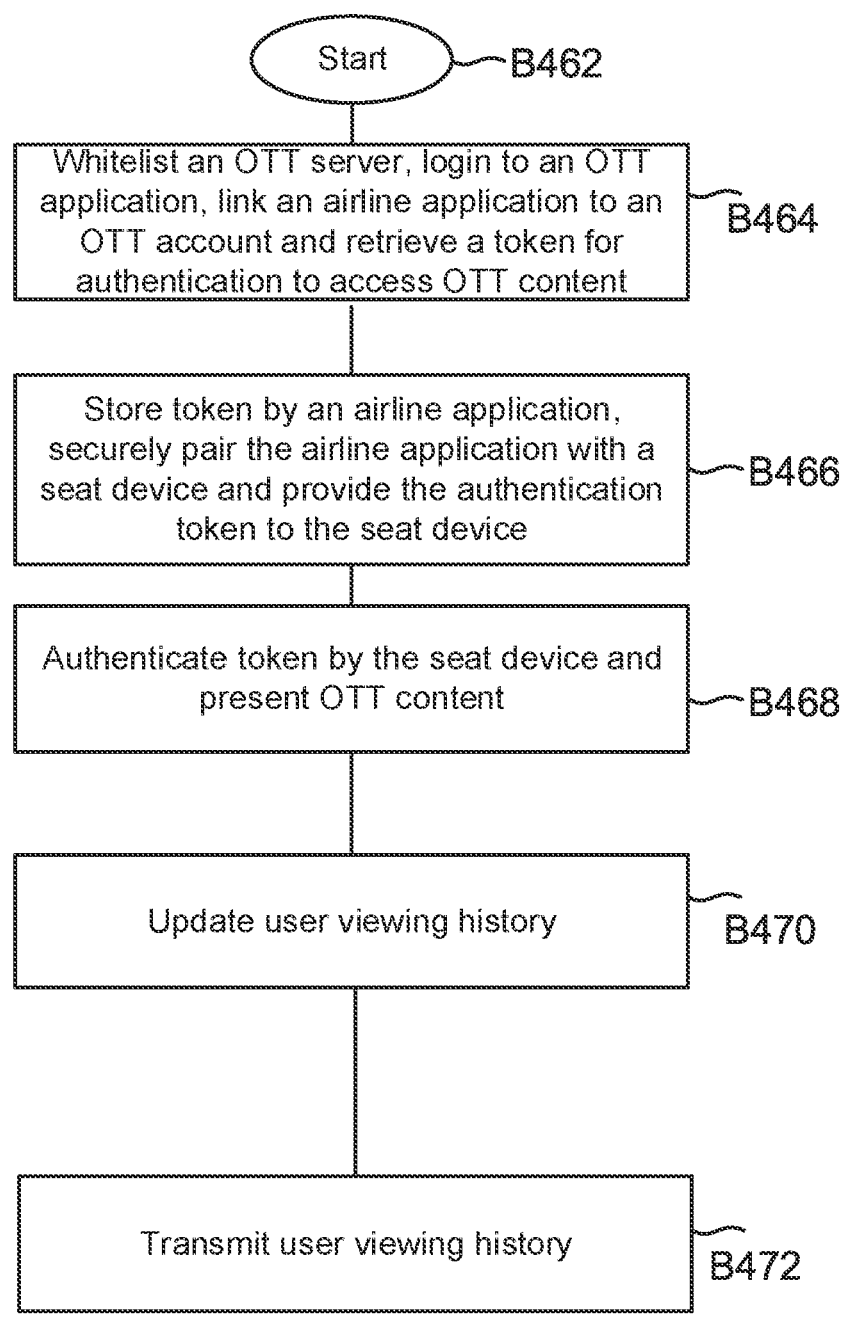
FIG. 4E shows a process flow diagram for presenting OTT content to a seat device using a whitelist of OTT servers, according to one aspect of the present disclosure.

FIG. 4E shows a process 460 for presenting OTT content on an aircraft, according to one aspect of the present disclosure. Process 460 begins in block B462, when PED 302 is initialized and operational before a flight.

In block B464, a passenger using PED 302 logs into the OTT application 318 using OTT credentials 322. Application 314 is linked with an OTT account 394 to retrieve a token that can be used to access OTT content, as described below. In another aspect, when enabled, application 314 and OTT application 318 automatically share data and credentials for logins. A whitelist of OTT servers is also provided to server 354 and/or the seat device 326. The whitelist indicates to the server 354 and the seat device 326 that OTT content from an OTT server (e.g., 360) is safe.

In block B466, application 314 stores the token in storage 316. Application 314 then pairs the PED 302 with the seat device 326 and provides the token to the seat device using either the process flow of FIG. 4C or 4D, described above in detail.

In block B468, the seat device 326 authenticates the token and enables access to OTT content 392. In one aspect, the OTT application 318 executed by the seat device 326 authenticates the received token. As described above, the OTT content can be retrieved from the OTT cache 384 and the ground caching device 366. In one aspect, OTT content 392 can be pre-fetched from the ground caching device 366 or the OTT cache 384, based on previous history for the user.

In block B470, the seat device 326 updates the viewing history of the OTT content by the user. In one aspect, the token received from the PED 302 is updated with the viewing history and stored within data structure 320. The viewing history includes an identifier that identifies a specific OTT content file, the time the user begins to watch the OTT content, and a file location when the user stops watching the content or any other information.

In block B472, the viewing history is transmitted to the PED 302, the OTT server 360 and/or the airline server 380. This enables the user to begin viewing the OTT content from where they left off on a next flight and/or a different device after the flight ends.

In one aspect, innovative technology for a method is provided. The method includes: linking, by a processor of an electronic device (e.g., PED 302), an application with a streaming service application (e.g. OTT application 318) to retrieve a credential (e.g. 322) to access media content provided by a streaming service; transmitting, by the electronic device, the credential to a seat device (e.g. 326) of an aircraft via a wireless connection (or by capturing a QR code by a seat device camera (e.g. 370))on a first flight, the seat device paired with the electronic device; authenticating, by the seat device, the credential for authorized access to the media content that is pre-fetched by the aircraft and cached in a storage device on the aircraft; presenting, by the seat device, the media content; and updating, by the seat device, the credential with user viewing history of the media content indicating when presentation of the media content on the seat device is stopped.

Online Credential Management

Figure 5A:
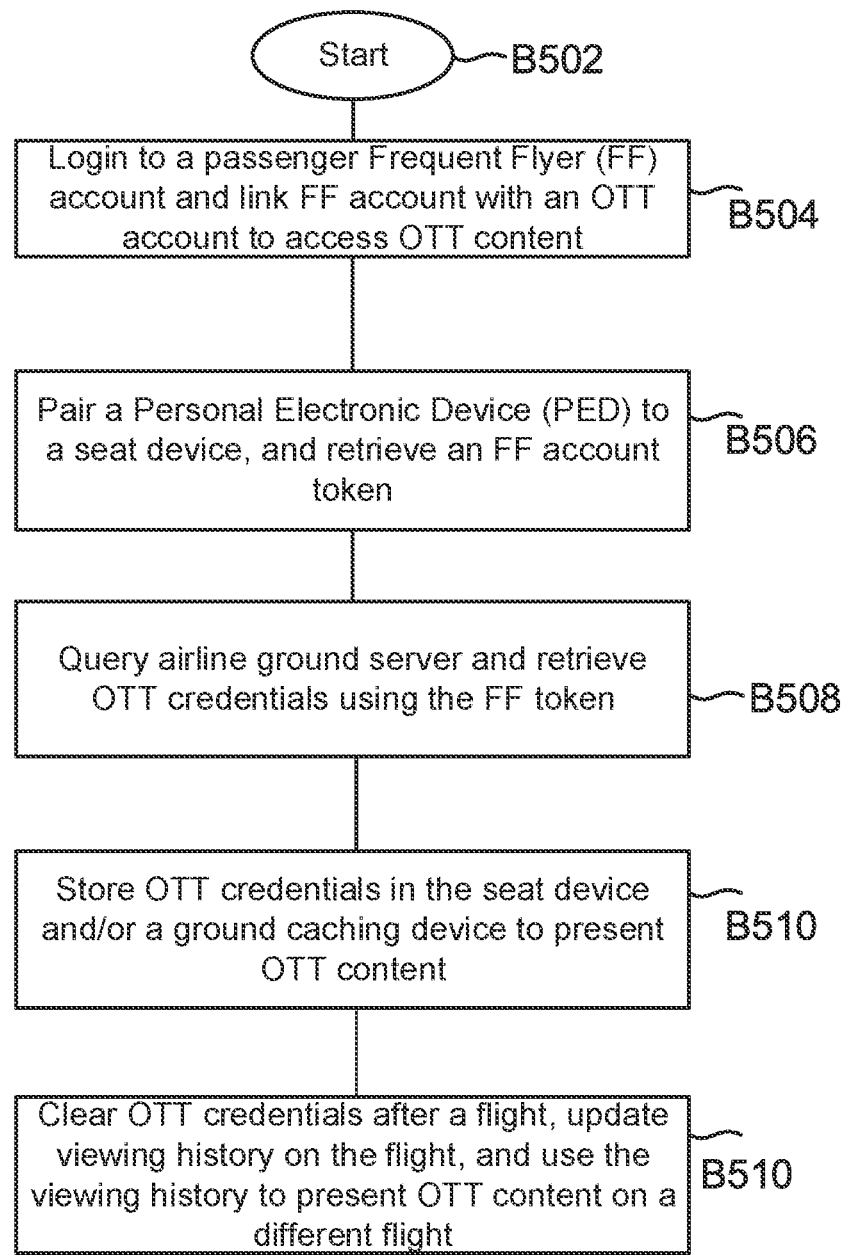
FIG. 5A shows a process flow diagram for presenting OTT content to a seat device on an aircraft using passenger data, when the aircraft has Internet connectivity, according to one aspect of the present disclosure.

FIG. 5A shows a process 500 for OTT credential management and presenting OTT content on an aircraft using passenger data/frequent flyer account, according to one aspect of the present disclosure. Process 500 assumes that the aircraft has Internet connectivity during the flight. Process 500 begins in block B502, when PED 302 is initialized and operational before a flight.

In block B504, a passenger using PED 302 logs into their frequent flyer account 382 using application 314. The frequent flyer account 382 is maintained by an airline server 380. The frequent flyer account 382 is linked to a user OTT account 394 such that the credentials used to access the frequent flyer account 382 can be linked to OTT credentials 322. Application 314 is linked with OTT application 318 to retrieve a token that can be used to access OTT content for an OTT account. Application 314 then stores a frequent flyer token 386 that can be used to access OTT credentials 322.

In block B506, application 314 pairs the PED 302 with the seat device 326 and transmits the frequent flyer token 386.

In block B508, a query is generated by the seat device 326 to retrieve the OTT credentials 322 using the frequent flyer token 386. The query may be sent to the airline server 380 via the server 354 using an Internet connection. The airline server 380 responds to the query with OTT credentials 322 and a whitelist of OTT servers (e.g., 360).

In block B510, the OTT credentials 322 can be stored by the seat device 326, server 354 and/or the ground caching device 366. The OTT credentials 322 are used by the OTT application 318 to present OTT content. As described above, the OTT content can be retrieved from the OTT cache 384 and the ground caching device 366. In one aspect, OTT content can be pre-fetched from the ground caching device 366 or the OTT cache 384, based on previous viewing history of the user. The seat device 326 also updates the viewing history of the OTT content. The viewing history is stored in data structure 320 and includes an identifier that identifies a specific OTT content file, the time the user begins to watch the OTT content, a file location when the user stops watching the content or any other information.

In block B512, after the flight is over, the OTT credentials are cleared automatically. This maintains user account security and privacy. The viewing history is transmitted to the PED 302, the OTT server 360 and/or the airline server 380, when network connectivity is available. This enables the user to begin viewing the OTT content from where they left off on a next flight and/or a different device after the flight ends.

Offline Credential Management

Figure 5B:
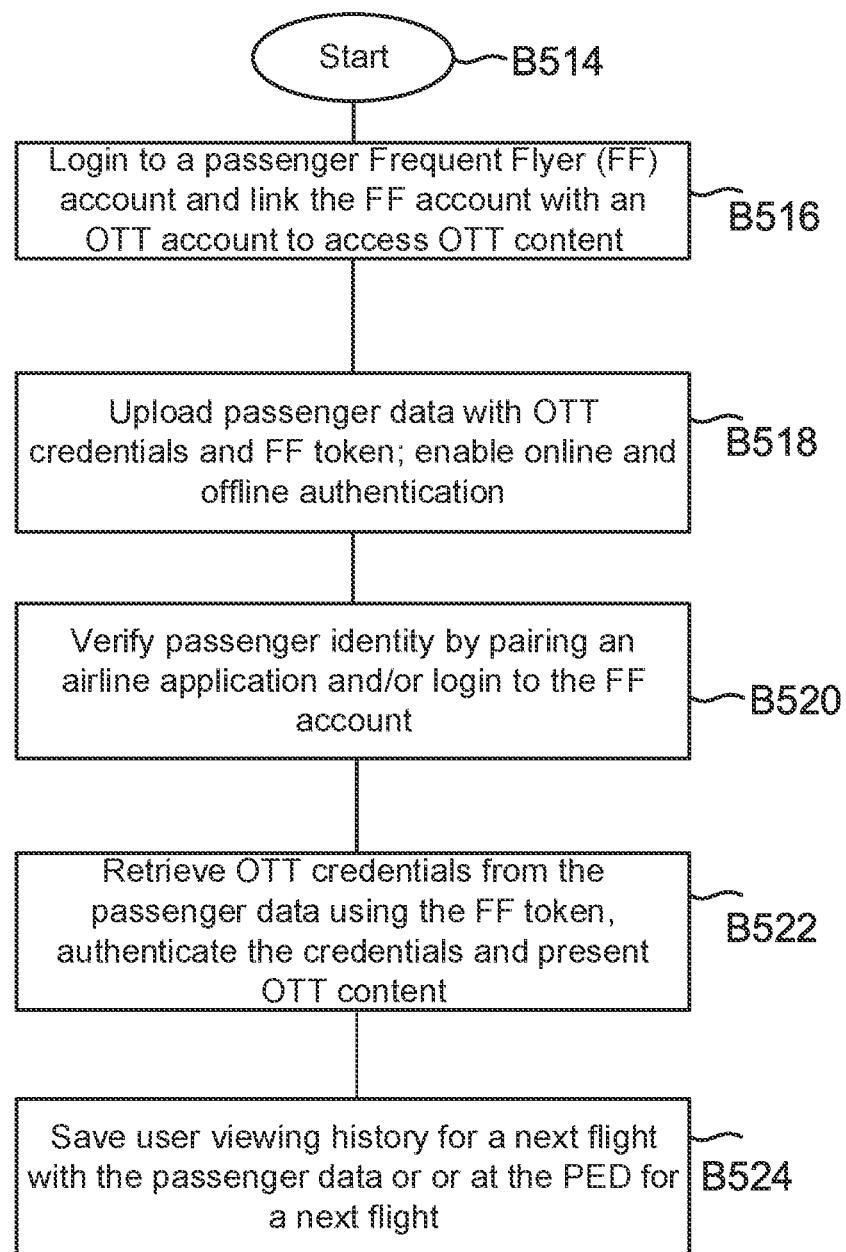
FIG. 5B shows a process flow diagram for presenting OTT content to a seat device on an aircraft using passenger data, when the aircraft does not have Internet connectivity, according to one aspect of the present disclosure.

FIG. 5B shows a process 500A for offline OTT credential management and presenting OTT content on an aircraft using passenger data/frequent flyer account, according to one aspect of the present disclosure. Process 500A begins in block B514 when PED 302 is initialized and operational before a flight.

In block B516, a passenger using PED 302 logs into their frequent flyer account 382 using application 314. The frequent flyer account 382 is maintained by the airline server 380. The frequent flyer account 382 is linked to the user OTT account 394 such that the credentials used to access the frequent flyer account are linked to the OTT credentials 322. Application 314 is linked with the OTT application 318 to retrieve a token that can be used to access OTT content 392 for the OTT account 394. Application 314 stores a frequent flyer token 386 that can be used to access OTT credentials 322. Application 314 may also store the OTT credentials 322 with the frequent flyer token 386.

In block B518, the passenger data 352 with OTT credentials 322 linked with frequent flyer credentials 386 are uploaded to server 354. In one aspect, online and offline authentication is enabled using server 354 and seat device 326. This maybe enabled when the airline server 380 uploads passenger data 352.

In block B520, application 314 pairs the PED 302 with the seat device 326 and transmits a frequent flyer token 386, and if available, linked OTT credentials 322 to the seat device 326. In another aspect, when the user logs into their frequent flyer account 382, the user identity is verified.

In block B522, OTT credentials 322 are retrieved from passenger data 352, e.g., by using the frequent flyer token 386, if the application did not provide the OTT credentials 322. The OTT credentials 322 are authenticated by the OTT application 318, prior to presenting the OTT content. As described above, the OTT content can be retrieved from the OTT cache 384 and the ground caching device 366, when a network connection is available. In one aspect, OTT content can be pre-fetched from the ground caching device 366 or the OTT cache 384, based on previous viewing history of the user. The seat device 326 also updates the viewing history of the OTT content. The viewing history is stored in data structure 320 and includes an identifier that identifies a specific OTT content file, the time the user begins to watch the OTT content, a file location when the user stops watching the content or any other information.

In block B524, after the flight is over, the OTT credentials 322 are cleared automatically. This maintains user account security and privacy. The user viewing history is transmitted to the PED 302, OTT server 360 and/or the airline server 380, when network connectivity is available. This enables the user to begin viewing the OTT content from where they left off on a next flight and/or a different device after the flight ends.

In one aspect, methods and systems are provided for a transportation vehicle, including aircrafts. One method includes linking, by a processor of an electronic device (e.g., 302) of a user, a frequent flyer account (e.g., 382) credential with a streaming service account credential (e.g. 322) of a streaming service; storing, by an aircraft, a frequent flyer token (e.g. 386) with user data; pre-fetching, by an aircraft, media content from the streaming service based on user viewing history (e.g., 320); receiving, by a seat device of the aircraft, the frequent flyer token from the electronic device for authentication during a first flight to access the media content, the seat device paired with the electronic device; authenticating, by the seat device, the frequent flyer token using the stored user data; presenting, by the seat device, the media content; and updating, by the seat device, the frequent flyer token with user viewing history of the media content indicating when presentation of the media content on the seat device was stopped.

Figure 5C:
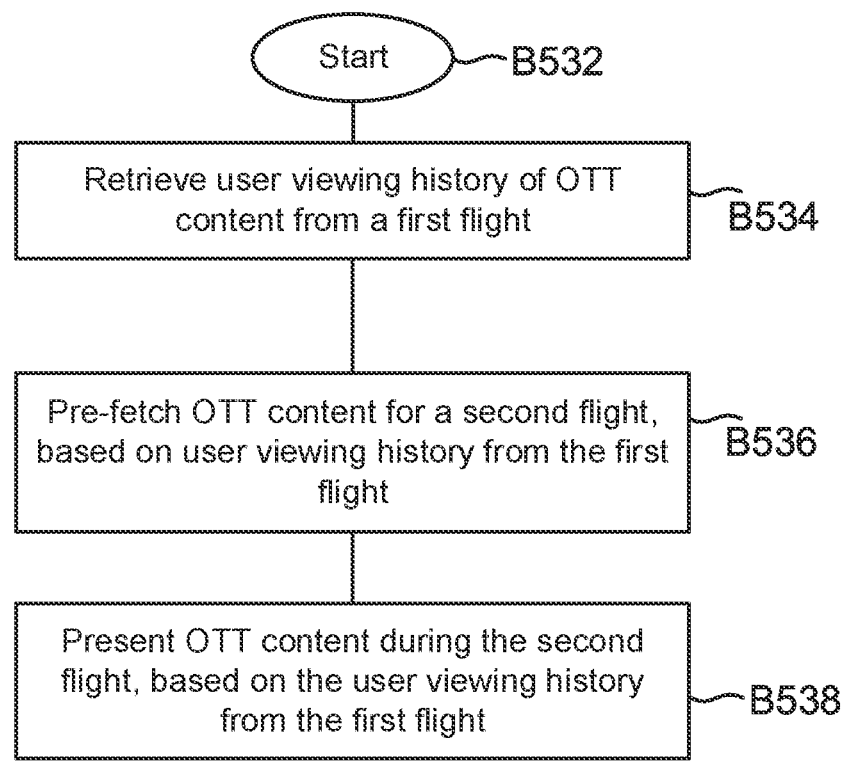
FIG. 5C shows another process flow diagram for presenting OTT content, according to one aspect of the present disclosure.

FIG. 5C shows a process 530 for resuming OTT content presentation after a first flight, according to one aspect of the present disclosure. Process 530 begins after a first passenger flight ends. OTT credentials 322 from the first flight are cleared and viewing history 320 has been transmitted to PED 302, OTT server 360 and/or the airline server 380. The passenger boards the second flight and OTT credentials 322 are accessed using one of the processes described above. In block B534, user viewing history is retrieved. In one aspect, an authentication token includes the viewing history. In another aspect, the viewing history may be part of the passenger data 352. Based on the viewing history, in block B536, OTT content for the second flight is retrieved, either from the ground caching device 366 or the OTT cache 382. In block B538, the OTT content for the second flight is presented on the seat device 326 or the PED 302 from where the user left off on the first flight.

Processing System

Figure 6:
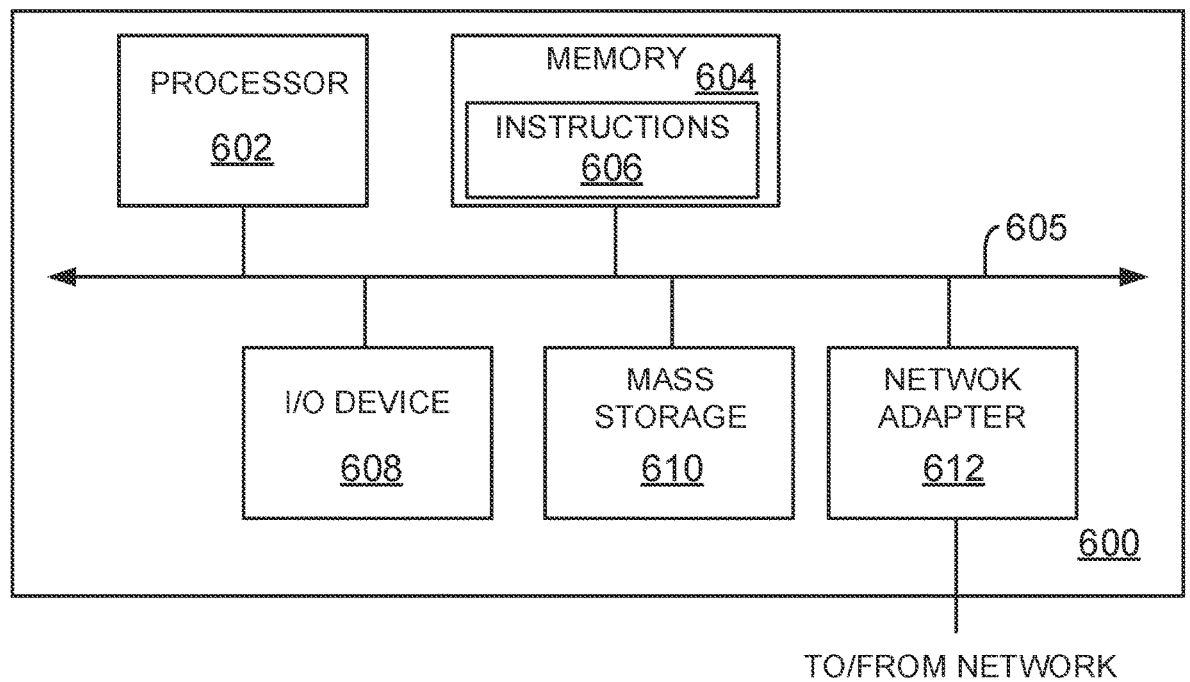
FIG. 6 shows a block diagram of a computing system, used according to one aspect of the present disclosure.

FIG. 6 is a high-level block diagram showing an example of the architecture of a processing system 600 that may be used according to one aspect. The processing system 600 can represent a ground caching device 366, airline server 360, OTT server 366, media server 112, computing system 106/107, WAP 130, onboard management system 344, seat device 326 or any user device (PED 302) that attempts to interface with a vehicle computing device. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 is an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 602 are the central processing units (CPUs) of the processing system 600 and, thus, control its overall operation. In certain aspects, the processors 602 accomplish this by executing software stored in memory 604. A processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random access memory (RAM), read-only memory (ROM), flash memory, or the like, or a combination of such devices. Memory 604 includes the main memory of the processing system 600. Instructions 606 may be used to implement application 314, OTT application 318, data structure 320 and/or the process steps of FIGS. 4A-4E and 5A-5C described above.

Also connected to the processors 602 through the bus system 605 are one or more internal mass storage devices 610, and a network adapter 612. Internal mass storage devices 610 may be or may include any conventional medium for storing large volumes of data in a non-volatile manner, such as one or more magnetic or optical based disks, flash memory, or solid-state drive.

The network adapter 612 provides the processing system 600 with the ability to communicate with remote devices (e.g., over a network) and may be, for example, an Ethernet adapter or the like.

The processing system 600 also includes one or more input/output (I/O) devices 608 coupled to the bus system 605. The I/O devices 608 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for presenting OTT media content on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
caching, by a ground-based caching device, media content provided by a streaming service;
pre-fetching, by a server on an aircraft, a portion of the cached media content that is likely to be viewed by passengers on the aircraft, the pre-fetched content stored in a cache on the aircraft;
presenting, to a first device on the aircraft, a first subset of the pre-fetched content to a non-subscriber of the media content on a first flight;
presenting, to a second device on the aircraft, a second subset of the pre-fetched content to a subscriber of the media content on the first flight; and
storing, by the second device, viewing history of the second subset by the subscriber; wherein the viewing history of the subscriber is used on a second aircraft on a second flight to resume presentation of the second subset of the media content.

2. The method of claim 1, wherein the first device is a seat device.

3. The method of claim 1, wherein the first device is a personal electronic device (PED).

4. The method of claim 1, further comprising:
interrupting, at the first device, presentation of the first subset to request information regarding the non-subscriber;
transmitting, by the aircraft server, information regarding the non-subscriber to the streaming service; and
presenting, by the first device, a subscription offer to the non-subscriber to subscribe for the media content.

5. The method of claim 1, wherein the pre-fetched content is in a first resolution that is lower than a second resolution of the media content stored at the ground-based caching device.

6. The method of claim 1, wherein the first subset of the pre-fetched media content is shorter in duration than the second subset of the pre-fetched media content.

7. The method of claim 1, wherein the first subset of the pre-fetched media content is same in duration than the second subset of the pre-fetched media content.

8. A non-transitory storage medium having stored thereon instructions for performing a method comprising machine executable code, which when executed by one or more machines, causes the one or more machines to:
 cache, by a ground-based caching device, media content provided by a streaming service;
 pre-fetch, by a server on an aircraft, a subset of the cached media content that is likely to be viewed by passengers on the aircraft, the pre-fetched content stored in a cache on the aircraft;
 present, to a first device on the aircraft, a first subset of the pre-fetched content to a non-subscriber of the media content on a first flight;
 present, to a second device on the aircraft, a second subset of the pre-fetched content to a subscriber of the media content on the first flight; and
 store, by the second device, viewing history of the second subset by the subscriber; wherein the viewing history of the subscriber is used on a second aircraft on a second flight to resume presentation of the second subset of the media content.

9. The non-transitory storage medium of claim 8, wherein the first device is a seat device.

10. The non-transitory storage medium of claim 8, wherein the first device is a personal electronic device (PED).

11. The non-transitory storage medium claim 8, wherein the machine executable code, further causes the one or more machines to:
 interrupt, at the first device, presentation of the first subset to request information regarding the non-subscriber;
 transmit, by the aircraft server, information regarding the non-subscriber to the streaming service; and
 present, by the first device, a subscription offer to the non-subscriber to subscribe for the media content.

12. The non-transitory storage medium of claim 8, wherein the pre-fetched content is in a first resolution that is lower than a second resolution of the media content stored at the ground-based caching device.

13. The non-transitory storage medium of claim 8, wherein the first subset of the pre-fetched media content is shorter in duration than the second subset of the pre-fetched media content.

14. The non-transitory storage medium of claim 8, wherein the first subset of the pre-fetched media content is same in duration than the second subset of the pre-fetched media content.

15. A system, comprising: a memory containing machine readable medium with machine executable code having stored thereon instructions; and
 a processor coupled to the memory, to execute the machine executable code to:
 cache in a ground-based caching device, media content provided by a streaming service;
 pre-fetch for a server on an aircraft, a subset of the cached media content that is likely to be viewed by passengers on the aircraft, the pre-fetched content stored in a cache on the aircraft;
 present, to a first device on the aircraft, a first subset of the pre-fetched content to a non-subscriber of the media content on a first flight;
 present, to a second device on the aircraft, a second subset of the pre-fetched content to a subscriber of the media content on the first flight; and
 store, by the second device, viewing history of the second subset by the subscriber; wherein the viewing history of the subscriber is used on a second aircraft on a second flight to resume presentation of the second subset of the media content.

16. The system of claim 15, wherein the first device is a seat device.

17. The system of claim 15, wherein the first device is a personal electronic device (PED).

18. The system of claim 15, wherein the machine executable code, further causes the one or more machines to:
 interrupt, at the first device, presentation of the first subset to request information regarding the non-subscriber;
 transmit, by the aircraft server, information regarding the non-subscriber to the streaming service; and
 present, by the first device, a subscription offer to the non-subscriber to subscribe for the media content.

19. The system of claim 15, wherein the pre-fetched content is in a first resolution that is lower than a second resolution of the media content stored at the ground-based caching device.

20. The system of claim 15, wherein the first subset of the pre-fetched media content is shorter in duration than the second subset of the pre-fetched media content.

* * * * *